United States Patent [19]

Cornell et al.

[11] Patent Number: 4,599,490

[45] Date of Patent: Jul. 8, 1986

[54] CONTROL OF TELECOMMUNICATION SWITCHING SYSTEMS

[75] Inventors: Ronald G. Cornell, Wheaton; George D. Huensch, Aurora; Kenneth W. Shelhamer, Naperville; Pramod Warty, Woodridge, all of Ill.

[73] Assignee: AT&T Bell Laboratories, Murray Hill, N.J.

[21] Appl. No.: 563,254

[22] Filed: Dec. 19, 1983

[51] Int. Cl.$^4$ ............................................. H04Q 7/04
[52] U.S. Cl. ................................. 179/2 EB; 179/2 E
[58] Field of Search ................. 179/2 E, 2 EA, 2 EB, 179/2 EC, 99 R; 455/33

[56] References Cited

U.S. PATENT DOCUMENTS

| | | | |
|---|---|---|---|
| 3,663,762 | 5/1972 | Joel, Jr. ................................. | 179/41 |
| 3,906,166 | 9/1975 | Cooper et al. ........................ | 179/41 |
| 4,144,411 | 3/1979 | Frenkiel ................................ | 179/2 |
| 4,144,496 | 3/1979 | Cunningham et al. ............... | 325/53 |
| 4,228,319 | 10/1980 | DeJager et al. ..................... | 179/2 |
| 4,242,538 | 12/1980 | Ito et al. .......................... | 179/2 EB |
| 4,268,722 | 5/1981 | Little ................................. | 179/2 |
| 4,398,063 | 8/1983 | Hass et al. ........................... | 179/2 |
| 4,399,555 | 8/1983 | MacDonald et al. ................. | 455/33 |

FOREIGN PATENT DOCUMENTS 2075799 11/1981 United Kingdom .

OTHER PUBLICATIONS

S. Horing, J. Z. Menard, R. E. Staehler, and B. J. Yokelson, "Stored Program Controlled Network: Overview", *The Bell System Technical Journal*, vol. 61, No. 7, Sep. 1982, pp. 1579-1588.
J. J. Lawser, R. E. LeCronier, and R. L. Simms, "Stored Program Controlled Network: Generic Network Plan", *The Bell System Technical Journal*, vol. 61, No. 7, Sep. 1982, pp. 1589-1598.
L. J. Gawron, S. J. Lueders, and K. L. Moeller, "Stored Program Controlled Network: No. 1/1A ESS-SPC Network Capabilities and Signaling Architecture", *The Bell System Technical Journal*, vol. 61, No. 7, Sep. 1982, pp. 1611-1636.
D. Sheinbein and R. P. Weber, "Stored Program Controlled Network; 800 Service Using SPC Network Capability", *The Bell System Technical Journal*, vol. 61, No. 7, Sep. 1982, pp. 1737-1744.
E. A. Davis, C. J. Funk, and J. M. Sebeson, "Stored Program Controlled Network: CCIS and SPC Network Performance", *The Bell System Technical Journal*, vol. 61, No. 7, Sep. 1982, pp. 1637-1654.
D. W. Brown, J. J. Driscoll, and F. M. Lax, "No. 10A Remote Switching System: Host Software", *The Bell System Technical Journal*, vol. 61, No. 4, Apr. 1982, pp. 491-524.
Z. C. Fluhr and P. T. Potter, "Advanced Mobile Phone Service: Control Architecture", *The Bell System Technical Journal*, vol. 58, No. 1, Jan. 1979, pp. 43-69.
F. J. Calvert and R. Uppal, "'Aurora'-Automatic Mobile Telephone System", *International Conference on Communications*, Jun. 1981, pp. 575.1-575.6.
C. A. Dahlbom and J. S. Ryan, "Common Channel Interoffice Signaling: History and Description of a New Signaling System", *The Bell System Technical Journal*, vol. 57, No. 2, Feb. 1978, pp. 225-250.
"The 3B20D Processor & DMERT Operating System", *The Bell System Technical Journal*, vol. 62, No. 1, Part 2, Jan. 1983, pp. 167-428.
Appl. Ser. No. 491,905, filed May 5, 1983, Huensch et al.

*Primary Examiner*—W. J. Brady
*Attorney, Agent, or Firm*—Werner Ulrich; Peter Visserman

[57] ABSTRACT

A method and apparatus for controlling a cellular mobile telecommunication system. A switch and a telecommunication control complex cooperate to set up connection between a telecommunication network, such as the common carrier public telephone network, and a plurality of mobile units. The switch sets up connections between trunks to the telephone network and communication links connected to the cell sites of the mobile telecommunication system. The telecommunication control complex, including a mobile telecommunication controller and the cell site controllers, controls the radio connections between these communication links and the mobile units.

28 Claims, 19 Drawing Figures

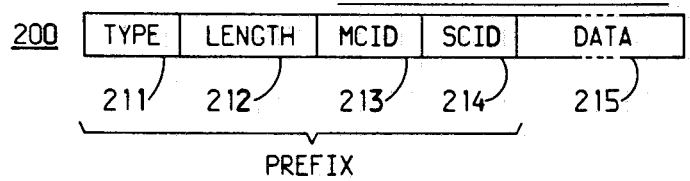
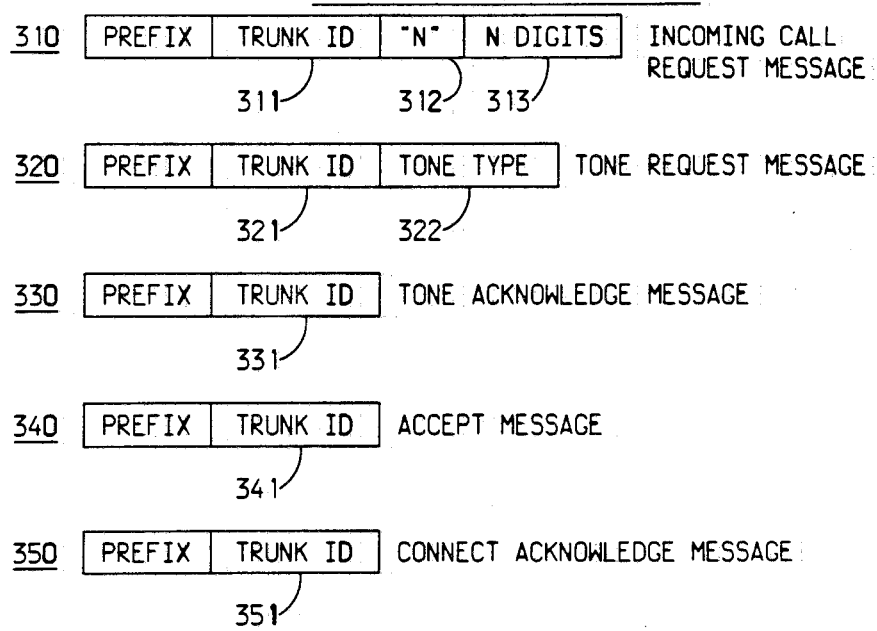
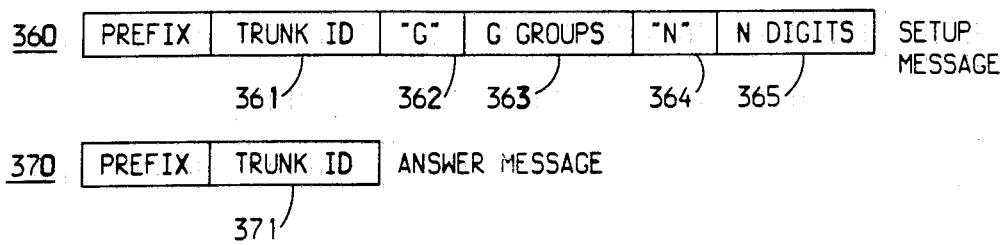

DISCONNECT MESSAGE TYPES

HAND-OFF MESSAGE TYPE

CALL WAITING SERVICE MESSAGE TYPES

INCOMING CALL

CALL-WAITING CALL

INCOMING CALL:
MULTISWITCH CONFIGURATION

CONTROL OF TELECOMMUNICATION SWITCHING SYSTEMS

TECHNICAL FIELD

This invention relates to telecommunication switching systems and more particularly to arrangements for controlling special purpose telecommunication systems.

BACKGROUND OF THE INVENTION

Special purpose telecommunication systems are used to provide a variety of specialized services. One example of such a system is a cellular mobile telecommunication system, which provides the service of connecting mobile telecommunication customers to land-based customers via the common carrier public telephone network. In such a system, all incoming and outgoing calls are funneled through a mobile telecommunication switching office, connected to a group of radio stations which communicate with mobile units. Another example of a special purpose telecommunication system is a private branch exchange complex connected to the common carrier public telephone network and including satellite private branch exchanges connected to a central private branch exchange. In such a system, all incoming and outgoing calls are funneled through the central private branch exchange to customers on the satellite private branch exchanges.

Special purpose telecommunication systems of the type discussed herein are normally characterized by having a two-stage connection process. A first stage is used, for example, to connect the mobile units of a cellular mobile telecommunication system to a communication link leading to the mobile telecommunication switching office or to connect the customers at satellite private branch exchanges to a communication link leading to the central private branch exchange. A second stage, effected in the mobile telecommunication switching office or central private branch exchange, is used to connect the communication link to a telecommunication network such as the common carrier public telephone network. The entire connection process is under the control of processors controlled by a complex program.

One example of a prior art special purpose telecommunication system is the Advanced Mobile Phone Service (AMPS) System described in *The Bell System Technical Journal (BSTJ)*, V. 58, No. 1, Part 3, January 1979, pp. 1–270. In this cellular mobile telecommunication system, the first stage connection is between a mobile unit and a communication link connected to a mobile telecommunication switching office. The mobile units are served by radio stations or cell sites, each of which is located in one cell area of a larger region. Each cell site in the region is connected by a group of communication links to the mobile telecommunication switching office. Each cell site contains a group of radio transceivers (transmitter/receivers), each transceiver being connected to one communication link. Each transceiver operates on a pair of frequencies, one frequency to transmit radio signals to a mobile unit, the other to receive radio signals from the mobile unit. A first-stage connection is set up when a transceiver, operating at a given frequency pair, is turned on and a mobile unit is tuned to the same frequency pair. The second stage of the connection, between a communication link and the common carrier public telephone network, is set up in the mobile telecommunication switching office which is connected to the telephone network by other communication links called incoming and outgoing trunks. The mobile telecommunication switching office contains a switching network to switch a mobile customer speech or a mobile customer data communication from the communication link to an incoming or outgoing trunk.

The mobile telecommunication system is controlled by processors including a mobile telecommunication controller at the mobile telecommunication switching office and a cell site controller at each cell site. A plurality of data links connect the mobile telecommunication controller and the cell site controllers. The mobile telecommunication controller under control of a complex program controls the switching network. It also controls the actions of cell site controllers by generating and interpreting the control messages that are exchanged over the data links. The cell site controllers at each cell site, in response to control messages from the mobile telecommunication controller, control the transceivers at the site. The control processors at each cell site also control the tuning of mobile units.

With today's rapidly moving technology, new and more efficient designs of telecommunication switches and telecommunication control systems are continually being evolved and the demand for new specialized telecommunication services is ever increasing. Prior art telecommunication system designs suffer from inflexibility and are difficult to adapt to the use of new, more cost-effective switching technologies and the offering of new specialized services. For example, to incorporate a new telecommunication switch into an existing specialized telecommunication service system design, or to adapt a prior art system to offer a new kind of telecommunication service, usually requires a major design effort. A complex new telecommunication switch control program must be designed and/or a major redesign of interface hardware between the control system and the units controlled by that system may be required.

SUMMARY OF THE INVENTION

In accordance with the present invention, a telecommunication control complex controls the connection between the telecommunication units and communication links to a telecommunication switch, and a separate telecommunication switch controls and sets up the connection between the communication links from a telecommunication network and the communication links to the telecommunication units. A data link is used for communications between the telecommunication control complex and telecommunication switch. When the telecommunication switch receives incoming call data including an identity code associated with a telecommunication unit from the telecommunication network, it sends identification data representing that identity code to the telecommunication control complex. The telecommunication control complex controls the connection of a communication link to a telecommunication unit corresponding to the identification data, and sends the identification of that communication link, connected to the telecommunication switch, back to the telecommunication switch. The telecommunication switch sets up a connection between the communication link to the telecommunication unit and the communication link from the telecommunication network associated with the incoming call. Advantageously, the first stage connection is set up under the control of the telecommunication control complex, and the second stage connection is separately set up by the telecommunication switch.

In one specific embodiment of the invention, the telecommunication control complex is used for controlling a cellular mobile telecommunication system. The mobile telecommunication control complex controls the operations of the radio transceivers, mobile units, and one end of the communication links connecting cell sites and a telecommunication switch. The control complex controls channel selection, paging, mobile alerting, and hand-off operations. A separate telecommunication switch controller, in a telecommunication switch, controls the setting up of a connection in a switching network between trunks to the common carrier public telephone network and communication links to the cell sites. A data link interconnects the telecommunication control complex and the telecommunication switch controller. When the telecommunication switch controller receives incoming mobile call data from the telephone network, it sends identification data corresponding to the incoming identity code to the telecommunication control complex. The telecommunication control complex controls the setting up of a connection between a mobile unit corresponding to the identification data and a selected one of the communication links connecting the cell sites and the telecommunication switch. The telecommunication control complex sends the identification of the selected communication link to the telecommunication switch which sets up a connection between the selected cell site communication link and the trunk from the telephone network associated with the incoming call.

In accordance with another aspect of the invention, a small group of primitive commands is exchanged between the telecommunication switch and the telecommunication control complex. Advantageously, the use of such primitive commands permits any modern program-controlled telecommunication switch to be readily adapted to communicate in a standard way with and to be responsive to commands from a telecommunication control complex. Thus, different telecommunication switch controllers and telecommunication control complexes, each controlling their own associated equipment, can easily be interconnected. For example, using this arrangement, a complete mobile telecommunication system can be formed using a standard mobile telecommunication control complex and using any manufacturer's adapted modern program-controlled telecommunication switch.

In accordance with one embodiment of the invention, in a mobile telecommunication system, a telecommunication switch controller adapted to generate and receive the primitive commands analyzes the digits of an incoming call entering the system on an incoming trunk and destined for a terminating mobile unit. Alternatively, the incoming call information whose digits are to be analyzed, is received on a common channel interoffice signaling (CCIS) facility. The telecommunication switch controller then sends a first primitive command, including identification data corresponding to the incoming call number, to the mobile telecommunication control complex. The mobile telecommunication control complex controls the paging and location of the terminating mobile unit and the setting up of a radio connection between the mobile unit and a communication link connecting a cell site to the telecommunication switch. The mobile telecommunication control complex then generates and sends a second primitive command to the telecommunication switch controller asking that a connection be set up between that communication link and the incoming trunk associated with the incoming call. In response to this second primitive command, the telecommunication switch controller controls its associated switching network to set up a connection between the incoming trunk and that mobile communication link.

In one specific embodiment, a hand-off of a mobile call from one cell site to another as the mobile moves from one cell area to another is accomplished by switching the radio connection from a mobile unit from one transceiver connected to one communication link to a different transceiver connected to a different communication link. This shift is effected under the control of the mobile telecommunication control complex. The control complex sends to the telecommunication switch controller another primitive command including the identity of the call and the different communication link; the telecommunication switch controller then switches the connection from the trunk connected to the common carrier network to the different communication link.

In accordance with one aspect of the invention, special communication services are implemented under the control of the telecommunication control complex by sending groups of primitive commands to the telecommunication switch controller. In one specific embodiment, in a cellular mobile telecommunication system, the call-waiting service permits mobile customers who are busy on one call to receive notification of a second call and to go back and forth between these two calls. When the second call comes into the system, the telecommunication switch controller transmits an incoming call request primitive command to the mobile telecommunication control complex; the control complex transmits a series of primitive commands for a circuit switch configuration change to the telecommunication switch controller. In response to mobile customer flash signals, detected under the control of mobile telecommunication control complex, the control complex generates commands requesting a switch configuration change.

The telecommunication switch configuration change requests are for a change of one of the two trunks to a hold state and a connection from the other trunk to the communication link connected to the mobile unit.

In accordance with an alternate embodiment of the invention, common channel interoffice signaling (CCIS) is used to communicate with the telecommunication network. Advantageously, such a signaling arrangement is highly flexible and permits data associated with customer and system services to be transmitted within the telecommunication network.

In accordance with yet another embodiment of the invention, two or more telecommunication switches are associated with one telecommunication control complex. Interswitch communication links are provided. An incoming call on one switch may be terminated via an interswitch link and a second switch. In a cellular mobile telecommunication system, calls may be handed off from a cell site connected to one of these switches to a cell site connected to another switch. Advantageously, this arrangement permits the use of several switches to reduce the cost of communication links to these switches, while retaining the advantage of centralized call control by a single telecommunication control complex.

BRIEF DESCRIPTION OF THE DRAWING

The invention may be better understood from the following description when read with reference to the drawing in which:

FIG. 2 illustrates a standard format of messages between the mobile telecommunication controller and the telecommunication switch controller of the system of FIG. 1;

FIG. 3-7 illustrate formats of different types of messages exchanged between the mobile telecommunication controller and the telecommunication switch controller of the system of FIG. 1;

DETAILED DESCRIPTION

Figure 1:
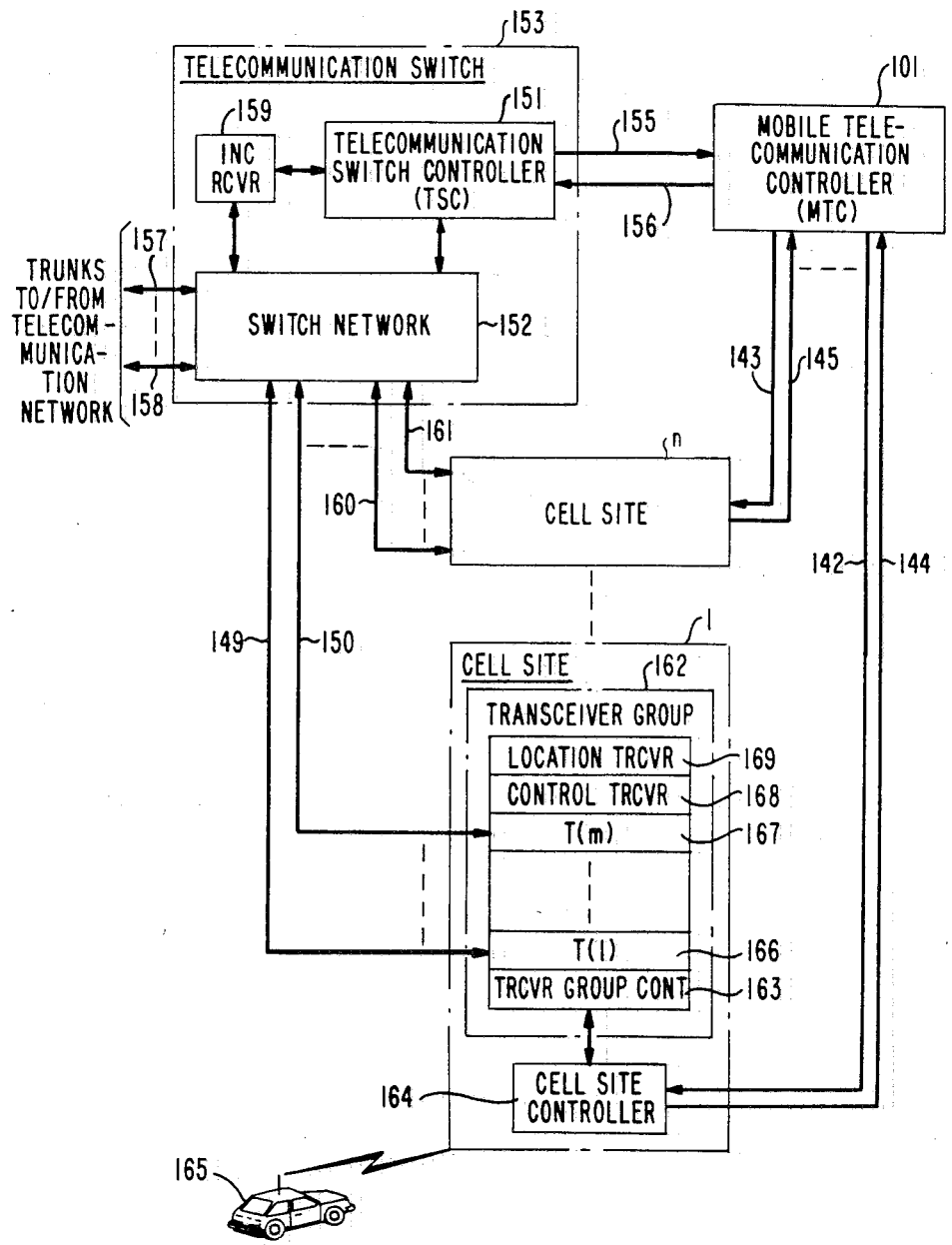
FIG. 1 is an overall block diagram of a cellular mobile communication system.

FIG. 1 illustrates an exemplary embodiment of the invention as applied to a mobile telecommunication system. The system includes a telecommunication switch 153, a mobile telecommunication controller 101, and a group of cell sites 1, . . . , n. Calls come into the telecommunication switch from a telecommunication network and are connected through the switch to a communication link terminated on a cell site. At the cell site, the communication link is connected to a transceiver which communicates with a mobile unit over a radio channel. The cell sites operate under the control of the mobile telecommunication controller from which they receive commands over a group of data links. The mobile telecommunication controller and the telecommunication switch also communicate over a data link and cooperate in setting up connections between a mobile unit and the telecommunication network.

Telecommunication switch 153 is connected to a telecommunication network, the common carrier public telephone network, by a group of communication links 157, . . . , 158. The communication links to the telephone network are commonly called trunks and are so called hereafter in the Detailed Description and Figures. Telecommunication switch 153 is also connected to groups of communication links such as 149, . . . , 150 and 160, . . . , 161, each of which groups connect the switch to one of the cell sites. Some or all of the communication links and trunks described herein may be channels on a multiplexed facility. Telecommunication switch 153 is controlled by telecommunication switch controller (TSC) 151. TSC 151 is connected to data links 155 and 156 in order to communicate with mobile telecommunication controller 101.

Cell sites 1, . . . , n are all similar. For convenience, details of only one of the cell sites, cell site 1, are shown. Similarly, only one mobile unit, mobile unit 165, near cell site 1, is shown, out of a large number of mobile units, groups of which are near each of the cell sites 1, ..., n. Cell site 1 sets up and controls the switchable connections between communication links 149, ..., 150, and nearby mobile units, such as mobile unit 165. Cell site 1 includes a cell site controller 164 which is connected by data links 142, 144 to mobile telecommunication controller 101. Cell site controller 164 is a commercially available microprocessor such as the Intel Corporation model 8086. Cell site 1 also includes a group of transceivers 166, a control transceiver 168, and a location transceiver 169, all under the control of one or more transceiver group controllers such as transceiver group controller 163. Transceiver group controller is a simple commercially available microprocessor such as the WE TM 8000 microprocessor sold by the Western Electric Company. Transceivers 166, . . . , 167, each communicate via a radio channel with a mobile unit, such as mobile unit 165. The transceiver group controllers operate under the control of cell site controller 164. The transceivers in cell site 1 are connected to communication links 149, ..., 150 which are connected to telecommunication switch 153.

Mobile telecommunication controller (MTC) 101 is a program-controlled processor which processes input data messages received over data links and generates and transmits output data messages over data links. MTC 101 communicates with telecommunication switch 153 via data links 155, 156, and communicates with the cell sites over other data links such as 142, 144.

The telecommunication switch, cell sites and MTC of the exemplary embodiment of the present invention are all commercially available units. It is therefore unnecessary to describe the internal operation of these units in detail. This description will concentrate on the data messages exchanged between MTC 101 and TSC 151 and the actions taken in the cell sites, telecommunication switch and MTC in response to these messages.

The MTC, the data links interconnecting the MTC and cell sites, and the cell site controllers and transceiver group controllers form a mobile telecommunication control complex and combine to control connections between a mobile unit and the communication links connected to telecommunication switch 153.

Control messages are exchanged within the mobile telecommunication control complex between the MTC and the cell site controllers such as controller 164. In the present embodiment of the invention, the cell sites are commercially available cell sites of the type used in the Autoplex TM 100 System manufactured by the Western Electric Company. Other commercially available cell sites generally similar in operation to those described in the previously cited January 1979 issue of the BSTJ could also be used.

MTC 101 is a program-controlled process, which may be one of several commerically available processors, plus a group of data link controllers. In this embodiment, a 3B TM 20D computer, manufactured by the Western Electric Company, described in the *Bell System Technical Journal*, Vol. 62, No. 1, Part 2, January 1983, pp. 167–415, is used.

The messages exchanged between the MTC and the cell sites in this exemplary embodiment, i.e., within the mobile telecommunication control complex, are mainly the same messages which are exchanged in the previously cited AMPS system, have been extensively described in the previously cited January 1979 issue of the BSTJ, and are not described in detail herein. However, those messages between cell sites and the mobile telecommunication controller used for vehicle location are modified and enhanced from those described in the previously cited *BSTJ* articles in accordance with an improved arrangement described in the copending application of G. D. Huensch et. al., entitled, "High Density Cellular Mobile Radio Communications", Serial No. 491,905, filed May 5, 1983.

In accordance with that improved arrangement, vehicle location is accomplished under the control of the cell site controllers, communicating among themselves via data messages. After a mobile unit has been located, a request message is sent from a controlling cell site to the MTC to request a hand-off of a mobile to one of an ordered list of designated candidate transceiver groups. Each transceiver group may include all communication transceivers of a cell site or only those connected to a particular directional antenna.

In accordance with the present invention, further data messages are exchanged over the data links 155, 156 between MTC 101 and telecommunication switch controller (TSC) 151. It is these messages which permit the two controllers to cooperate in setting up connections between a mobile unit and the telecommunication network.

The operation of the exemplary embodiment of the invention is illustrated with respect to FIG. 1 using an incoming call to mobile unit 165 from incoming trunk 158 connected to the telecommunication network. The incoming call is received in telecommunication switch 153. Incoming trunk 158 is initially connected to an incoming receiver 159 through switch network 152. TSC 151 accesses incoming receiver 159 to obtain the incoming digits received. TSC 151 then sends incoming call request message 310 (FIG. 3, described hereafter) to MTC 101 via data link 155.

In response to this incoming call message, MTC 101 first checks to make certain that the called mobile unit is not busy. If the called mobile unit is busy, a busy tone request message 320 (FIG. 3, described hereafter) is sent back to TSC 151 over data link 156. Telecommunication switch 153 is equipped with sources of tone (not shown) connected to switch network 152. In response to a busy tone request message, TSC 151 causes busy tone to be applied to incoming trunk 158 to inform the calling customer that the called mobile unit is busy.

If the called mobile unit is not busy, MTC 101 sends an audible tone request message to TSC 151. In response to the reception of this message, TSC 151 causes audible tone to be applied via switch network 152 to incoming trunk 158 to inform the originator of the incoming call that the called mobile is being paged. Meanwhile, MTC 101 sends a data message via data links such as 142, . . . , 143 to all those cell sites under the control of MTC 101 that are equipped with a paging transmitter requesting that they page the called mobile unit. These cell sites respond to the page request by paging the called mobile unit in a well known manner described, for example in Z. C. Fluhr et al.: Control Architecture, *BSTJ*, V. 58, No. 1, Part 3, January 1979, pp. 43–69.

The system's mobile units have standard equipment for use with cellular mobile systems. In response to the paging signals, mobile unit 165 detects that it is being paged and sends a page response over the transmit access channel corresponding to the strongest receive access channel. This page response is received in a control transceiver such as control transceiver 168 at the cell site which transmitted the strongest access channel signal and from then on controls the mobile unit. That cell site, cell site 1 in this case, sends a message via data link 144 notifying MTC 101 that the mobile unit has responded to the page. The MTC selects an idle transceiver, in this case transceiver 166. MTC 101 then sends a message to cell site controller 164 of cell site 1 requesting that transceiver 166 be made active and that a command be sent to the called mobile unit 165 to tune to the frequency pair associated with the selected transceiver 166.

In response to the message to cell site controller 164, transceiver 166 is made active. Control transceiver 168, under the control of transceiver group controller 163, sends a tuning control message to mobile unit 165 to tune the mobile unit to the same frequency pair as transceiver 166. The tuning control message is effectively part of an interconnecting means, causing a tunable radio to connect the customer to the selected transceiver which is connected by a communication link to a switch network. Here, the tuning action connects mobile 165 to transceiver 166; transceiver 166 is connected to communication link 149, which is connected to switching network 152 of the telecommunication switch 153. As a result of these actions, the called mobile unit 165 is connected via a radio channel to communication link 149.

As mentioned previously, in this embodiment of the invention, all of the actions involved in paging or locating the called mobile unit, selecting a transceiver, and tuning the mobile unit are performed basically as described in the previously cited January, 1979 issue of the *BSTJ* and in the previously cited copending application Ser. No. 491,905. In alternate embodiments, one or more stages of switching could be introduced between the transceiver and the link, or the transceivers could be effectively switched by being made tunable.

When the mobile unit 165 has been tuned to the frequency pair of transceiver 166, transceiver 166 sends an alert signal to the mobile. When the mobile answers, MTC 101 is notified by a message from cell site controller 164. MTC 101 then sends an accept message to TSC 151. In response to the accept message, TSC 151 causes a connection to be set up in switch network 152 of telecommunication switch 153 between incoming trunk 158 and communication link 149 which is now connected to the called mobile unit.

A calling party disconnect of the incoming call is detected in telecommunication switch 153; a called party disconnect is detected in the controlling cell site. If the disconnect is detected in telecommunication switch 153, TSC 151 sends to MTC 101 a disconnect message. In response to such a disconnect message, MTC 101 sends a message via data link 142 to cell site 1 to turn off the transceiver which handled this call. MTC 101 then sends a clear message, to TSC 151, to request that the connection between communication link 149 and the connected incoming trunk be torn down.

Before going further into the details of the messages exchanged between MTC 101 and TSC 151, it is appropriate to make a few general observations. The incoming directory number received by telecommunication switch 153 represents an identity code of a mobile unit. For some services, the identity code may refer to more than one mobile unit, or may have a changeable correspondence with a mobile unit. For example, when series completion service is provided, if a call comes in to a primary mobile unit that is busy, the call is terminated to a secondary unit. If call forwarding service is provided, a call normally directed to a first mobile unit is completed to a second mobile unit or some other customer station at the discretion of the first mobile unit customer.

The identity code received by the mobile telecommunication switch need not be the same as the identification data sent by the telecommunication switch controller to the mobile telecommunication controller. For example, in alternate embodiments of the present invention, the identification data could be in binary code, or could be a translated version of the identity code for an alternate implementation of a call feature such as call forwarding.

In general, incoming call data is received by some signaling means. As described above, the signaling means include an incoming receiver 159 to receive incoming digits from a trunk. In this type of signaling, a call request is associated with the trunk over which the incoming digits are received.

The number of received digits transmitted to MTC 101 in an incoming call request message can be an arbitrary number (usually restricted to 10) depending on the number of exchange codes handled by one MTC; the number of received digits may also vary with the characteristics of an incoming trunk group. The incoming trunk identification is sometimes used to augment a partial directory number; for example, if the incoming call is from a step by step office, only four or five digits may be transmitted and the distinction between two mobiles with common last four or five digits may be made by the incoming trunk group number. In alternate embodiments, a full directory number can be forwarded. It is also possible to perform preliminary translation in TSC 151, for example, for routing to one of several mobile telecommunication controllers.

Modern program-controlled telecommunication switches are programmed to set up connections, to generate and transmit messages, and to receive and interpret messages. The process of setting up connections is described, for example, in the *BSTJ*, Vol. 43, No. 5, Parts 1 and 2, September 1964, pp. 1831-2609, and is well known in the art. One type of operating system, typical of those well known in the art, which can be used to generate, interpret, transmit and receive data messages is the DMERT system described in the *BSTJ*, Vol. 62, No. 1, Part 2, January 1983, pp. 167-415. When a connection is requested via an incoming data message, it is a straightforward matter using existing well known program techniques to interpret this message and initiate the setting up a connection and transmit a message containing this data to another processor to set up such a connection. Thus, telecommunication switch 153 may be any commercially available modern program-controlled switch capable of performing all normal required telephone functions and able to generate transmit, receive, and data messages. Note that FIG. 1 shows only the parts of telecommunication switch 151 necessary for an understanding of the present invention.

The telecommunication switch used in this embodiment of the present invention is a DIMENSION ® System 85 PBX switch, manufactured by the Western Electric Company. The switch has been adapted to exchange control messages with MTC 101 and to respond to such messages. This adaptation has been accomplished with little effort, and other modern switches can readily be similarly adapted, using program techniques well known in the art, by minimizing the number of messages and by utilizing the existing programs required for basic switching and message processing purposes which are provided with commercially available telecommunication switches.

In the present embodiment of the invention, the telecommunication switch can also be directly connected to private branch exchange (PBX) stations. The TSC 151 analyzes the incoming digits to see if they represent the identification of a mobile unit prior to sending an incoming call message. In alternate embodiments, the telecommunication switch might be directly connected to other customer stations, requiring translation prior to sending an incoming call message, or be connected only to cell sites 1 through n, in which case no translation is required prior to sending an incoming call request message.

The operation of the system is described in more detail with reference to the messages between MTC 101 and TSC 151 shown in FIG. 2-7, and the flow diagrams of FIG. 9-13. All of these messages have a format including a standard four-field prefix, shown in FIG. 2. The first field of this prefix is the type field 211 which indicates the type of message, such as tone request, accept, clear, incoming call, or disconnect. The second field 212 is a length field, required because different messages have different lengths. For example, a message for an outgoing call is a relatively long message containing the digits dialed by the mobile originating customer. The next two fields 213 and 214 specify the MTC call identifier and the TSC call identifier, respectively. These identify the particular call being processed to the MTC and the TSC. Since each call has its own associated block of memory in each of the two controllers, this identifier is associated with the block of memory which has been assigned to that call. In the initial stage of a call, only one of these fields may be specified in some messages. However, except for those messages, such as communication link maintenance messages, that are not associated with a call, at least one of these fields is always specified since the MTC or TSC which transmits the message has assigned memory to that particular call.

A general data field 215, also shown in FIG. 2 but not part of the standard prefix, represents a general and optional data field whose contents vary with the particular message type. The formats shown in FIGS. 3-7 specify the detailed format of the data field of some of the message types used in the present embodiment of the invention.

The term "Trunk ID" is used frequently in FIG. 3-7. The groups of communication links connecting the telecommunication switch to the individual cell sites, the interswitch link (to be discussed hereafter with reference to FIG. 14) and the trunk groups connecting the telecommunication switch to different telecommunication switches in the telecommunication network are treated within the TSC 151 and MTC 101 as a set of trunk groups, each trunk group containing a specified number of members. Many of the messages specify an individual trunk or link by specifying a trunk group number and member number within the group. For easy identification, different ranges of group numbers are used for trunks, communication links and interswitch links. For simplicity, the identification of a trunk, communication link, or interswitch link group and member number is shown as "Trunk ID" in the data field formats of FIG. 3 through 7.

Figure 5:
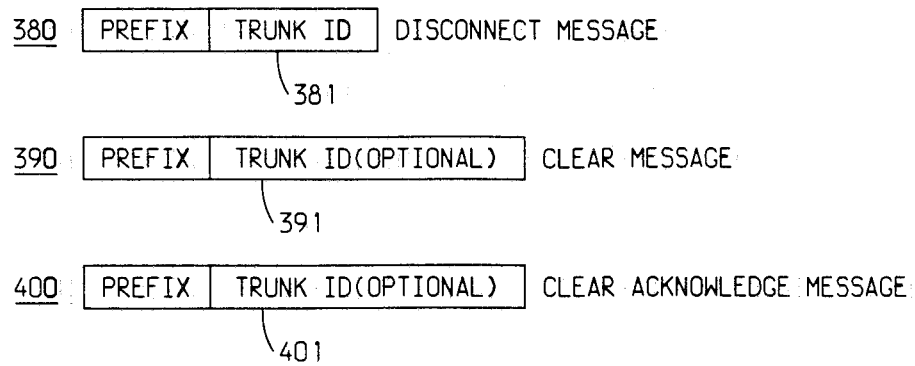
Figure 6:
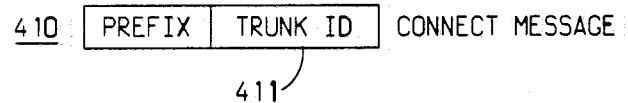
Figure 7:
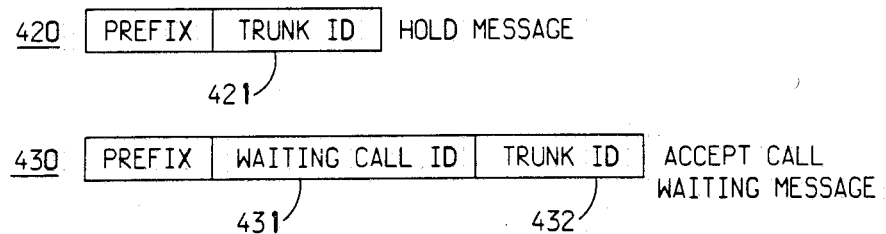

Each of the message formats shown in FIG. 3 through 7 has a different value in the type field 211, identifying the type of message being transmitted or received. FIG. 3 shows the message formats required for processing an incoming call to a mobile unit to the point where a talking connection has been set up. FIG. 4 shows additional message formats for processing an outgoing call from a mobile unit. FIG. 5 shows additional message formats required for processing a call disconnect. FIG. 6 shows an additional message format required for the hand-off operation to permit a different cell site to control a call as a mobile moves from one cell area to another within the region controlled by an MTC. FIG. 7 shows additional message formats required for controlling calls using the call waiting service.

Figure 9:
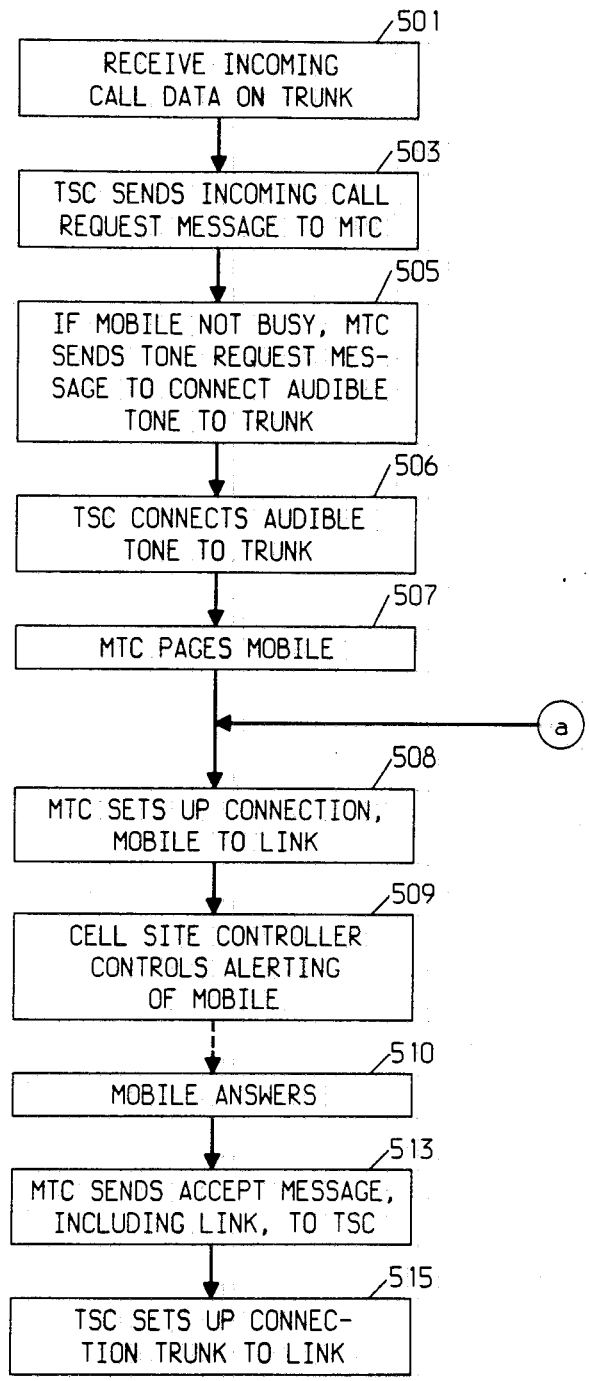
FIG. 9-13 are flow diagrams of the steps of processing various types of calls in the system of FIG. 1.

The messages of FIG. 3-7 will be discussed in conjunction with the flow diagrams of FIG. 9-13 in order to describe the system operation. In the interest of conciseness, and to allow the invention to be highlighted, only the primary flow is described in the flow diagrams of FIG. 9-13. FIG. 3 and FIG. 9 are pertinent to an incoming call.

Assume that an incoming call is received on incoming trunk 158 (FIG. 1). As previously described, the trunk is connected to an incoming receiver 159 which receives the incoming call data (action box 501, FIG. 9). The telecommunication switch control (TSC) 151 then formulates and sends an incoming call request message 310 (FIG. 3) to MTC 101 (action box 503, FIG. 9). The incoming call request message 310, includes the "Trunk ID" of the incoming trunk 311, the number of digits "N" 312, and the values of these "N" digits 313. In response to this incoming call request message, the MTC checks whether the terminating mobile unit, in this case, mobile unit 165, is busy. If not, a tone request message 320 (FIG. 3), is sent to the TSC (action box 505, FIG. 9).

The tone request message includes the trunk ID of the incoming trunk 321 and the type of tone in this case audible tone, to be applied 322. In response to the reception of the tone request message, the TSC causes audible tone to be applied to the incoming trunk (action box 506, FIG. 9) so that the calling customer connected to the incoming trunk is made aware of the fact that the terminating mobile unit is being paged. When the TSC has caused audible tone to be connected to the incoming trunk, it sends to the MTC a tone acknowledge message 330. This message includes the trunk ID of the incoming trunk 331.

The MTC pages the mobile (action box 507, FIG. 9). When the MTC has detected a response to the page, in this case, via a message from cell site 1, the MTC selects an available transceiver such as transceiver 166 for the call. MTC 101 then sets up a connection between mobile unit 165 and communication link 149 connected to selected transceiver 166 (action box 508, FIG. 9). The connection is set up when MTC 101 causes cell site 1 to turn on transceiver 166 and, via control transceiver 168, causes the radio of mobile unit 165 to be tuned to the same frequency pair as that of transceiver 166. Cell site controller 164 causes transceiver 166 to alert mobile unit 165 (action box 509, FIG. 9). When mobile unit 165 answers (action box 510, FIG. 9), cell site controller 164 notifies MTC 101. (The lapse of time between alerting and answer is indicated by the dashed connection between action boxes 509 and 510 of FIG. 9.) The MTC then sends an accept message 340 to TSC 151 (action box 513, FIG. 9). The accept message 340 (FIG. 3) includes the trunk ID 341 of communication link 149.

In response to the reception of the accept message, the TSC removes the connection between incoming trunk 158 and the tone circuit and sets up the connection between incoming trunk 158 and communication link 149 (action box 515, FIG. 9). The TSC then sends a connect acknowledge message 350 to the MTC. This message includes the trunk ID 351 of communication link 149. The incoming call is now in the talking state. The connect acknowledge and other acknowledge messages of this system are used to enhance the integrity of the message exchange process.

Figure 10:
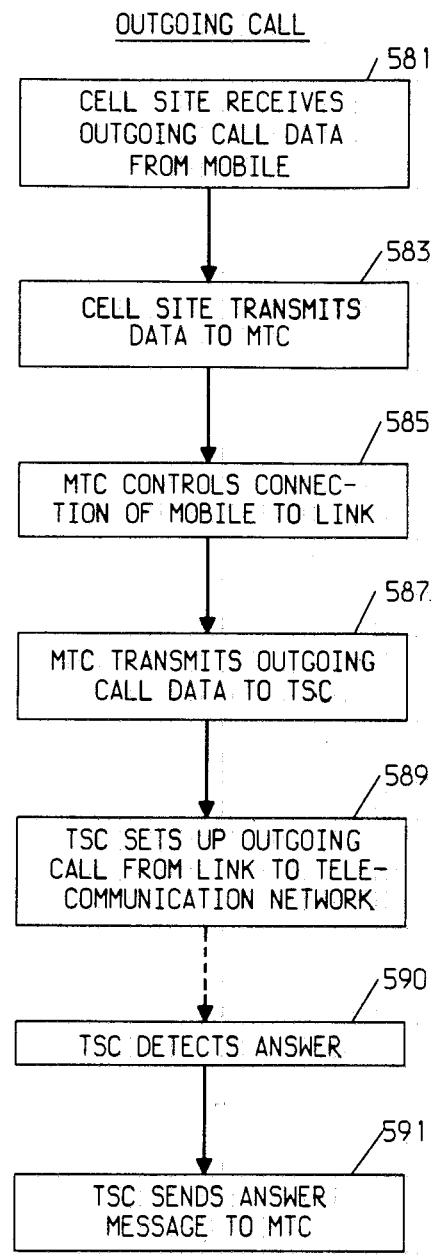

FIG. 4 illustrates the formats of the data field of messages additionally required for setting up outgoing calls and FIG. 10 illustrates the sequence of actions required for an outgoing call. Assume that mobile unit 165 places an outgoing call. When a mobile unit originates an outgoing call, the digits are received at the cell site (action box 581, FIG. 10) from which the mobile unit receives the strongest access channel signal and which controls the mobile unit originating the outgoing call. Assume that cell site 1 becomes the controlling cell site. The digits of the outgoing call are sent from controlling cell site 1 via a message over data link 144 from that controlling cell site to the MTC (action box 583, FIG. 10). MTC 101 then controls the set-up of a communication channel between mobile unit 165 and a transceiver, such as transceiver 166, connected to communication link 149 (action box 585, FIG. 10). Then MTC 101 sends a set-up message containing outgoing call data to TSC 151 (action box 587, FIG. 10).

The set-up message 360 (FIG. 4) is relatively complex, because in the present embodiment of the invention, the MTC performs the primary routing translation to select an appropriate trunk group for an outgoing call. This function is performed in the MTC so that a relatively limited controller can be used as TSC 151. Moreover, U.S. systems are likely to include a requirement that individual customers may select a specific preferred common carrier. This means that calls to a particular destination must be routed via different trunk groups depending on the choice of common carrier. Such a specialized requirement can be met without affecting the more general program of a telecommunication switch if route selection is performed by the MTC. In alternate embodiments, route selection can be performed by the TSC 151.

Because of the alternate routing requirement, the set-up message 360 specifies the preferred and alternate outgoing trunk groups, as well as the called number. The setup message 360 includes the trunk ID 361 of a selected communication link (in this case, link 149) from the controlling cell site of the originating mobile unit, the number "G" 362 of primary plus alternate outgoing trunk groups specified, the identifications of these G trunk groups 363, the number "N" of digits in the outgoing call 364, and the values of these N digits 365.

When TSC 151 receives the setup message, it sets up the outgoing call from link 149 to a selected outgoing trunk (action box 589, FIG. 10). TSC 151 selects an outgoing trunk from one of the groups specified in the setup message. These groups are arranged in order so that the TSC will first check if any outgoing trunk is available in the first group, then in the second group, etc. After TSC 151 has selected an available outgoing trunk, for example, trunk 157, in one of these trunk groups, it sends out the digits over that trunk and connects the specified communication link to that outgoing trunk.

When the TSC detects an answer on outgoing trunk 157, (action box 590, FIG. 10) it sends an answer message 370 (FIG. 4) to the MTC (action box 591, FIG. 10). The answer message 370, in addition to the prefix which specifies most of the needed data, includes the trunk ID 371 of the outgoing trunk. Specifying the trunk ID avoids additional processing for accessing this data in the MTC. The answer message is used by the MTC for billing purposes to indicate the beginning time of the call. In alternate embodiments, the billing data entry process can be performed by TSC 151.

Figure 11:
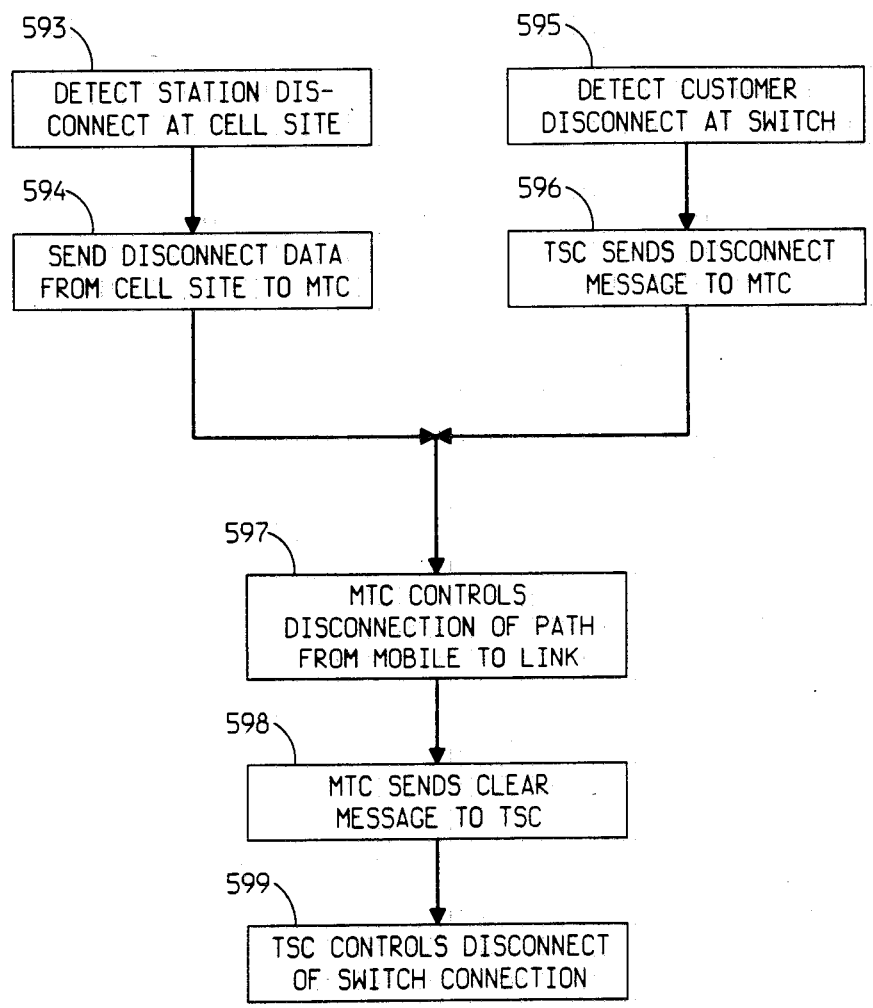

FIG. 5 shows the formats of additional messages required for processing disconnect operations, and FIG. 11 shows the flow of disconnect actions. Disconnects from the mobile are detected at the controlling cell site (action box 593, FIG. 11) and are signaled to the MTC via a data message over a data link from that cell site (action box 594, FIG. 11). Disconnects from the distant end are detected in the incoming or outgoing trunk circuit in the switch (action box 595, FIG. 11), and are signaled to the MTC via a disconnect message 380 (FIG. 5) from the TSC (action box 596, FIG. 11). The disconnect message includes the trunk ID 381 of the trunk associated with the connection which has disconnected. If the MTC has detected a disconnect or has received a disconnect message 380 from the TSC, the MTC takes appropriate actions to disconnect the path from the mobile unit to the link to telecommunication switch 153 (action box 597). Both the mobile unit and the transceiver used in the call are made available for another call. The MTC then sends a clear message 390 to the TSC (action box 598, FIG. 11). The clear message includes an optional trunk ID field 391 to specify a trunk or communication link for a partial disconnect action. In this case since the call is to be disconnected completely, the optional field is blank (set to zero). The "clear" type of message and the absence of an identification of a trunk or communication link indicates to the TSC that the connection is to be torn down completely. The TSC tears down the connection (action box 599, FIG. 11) and sends a clear acknowledge message 400 back to the MTC. The clear acknowledge message also contains an optional trunk ID field 401 for the identification of a trunk or communication link, which in this case is also blank.

Figure 12:
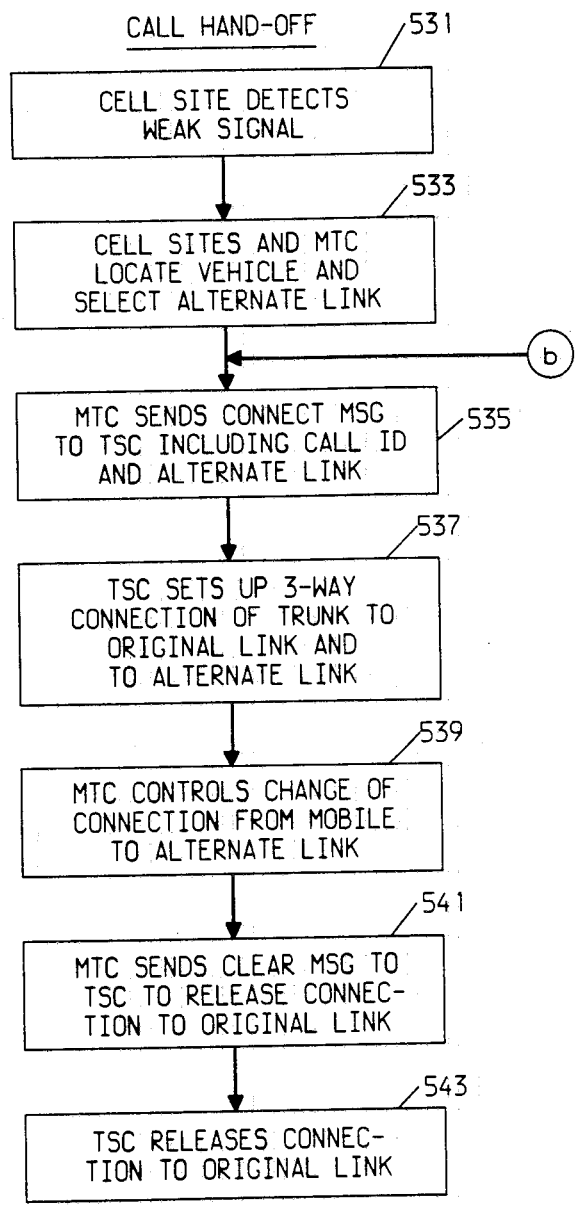

FIG. 6 shows an additional message format required for hand-off operations and FIG. 12 illustrates the flow of actions required for a hand-off. A hand-off operation is required when a mobile moves from one cell area to another and must therefore be connected via a different radio channel to another transceiver at another cell site. Consider the case where mobile unit 165 originally controlled by cell site 1 moves into the area of cell site n (FIG. 1). The process begins when the controlling cell site detects a weak radio signal from one of its controlled mobile units (action box 531, FIG. 12).

The controlling cell site 1 controls the location process and MTC 101 selects an alternate transceiver and communication link (action box 533, FIG. 12). The mobile is first located by measuring the signal strength of the mobile's transmitted signals in neighboring cell sites using tunable location transceivers such as transceiver 169 (FIG. 1). The signal strength measurements from nearby cell sites are sent to cell site 1 and compared by the controlling cell site controller 164.

Assume that mobile 165 has been located in the cell area of cell site n, and is to be switched to link 160. This requires that the incoming or outgoing trunk of the call also be connected to link 160. This is accomplished by first sending a connect message to TSC 151 (action box 535, FIG. 12). The connect message 410 (FIG. 6) includes a trunk ID field 411 for a trunk or communication link identification. In this case, the identification is that of the new communication link which should be added to the connection in order to allow for a minimum of interruption during the actual hand-off process. A three-way connection is set up so that both link 149 and link 160 are connected to trunk 158 (action box 537, FIG. 12).

When the TSC has set up this three-way connection, it sends a connect acknowledge message 350 to the MTC. The MTC carries out the operations required to connect the mobile unit 165 to the transceiver connected to communication link 160 in cell site n (action box 539, FIG. 12). A message to mobile 165 to retune to the frequency pair of the transceiver connected to communication link 160 is sent via transceiver 166. The MTC then sends to the TSC a clear message 390 (FIG. 5) specifying the identity of link 149 so that this link can be disconnected from the three-way connection (action box 541, FIG. 12). The TSC responds to the clear message by disconnecting link 149 (action box 543, FIG. 12) and sending a clear acknowledge message 400 to the MTC to indicate the completion of the action. The trunk is now connected only to communication link 160. The MTC can now cause transceiver 166 to become inactive via a message to cell site controller 164.

Complex modern telecommunication services such as the call waiting service can also be implemented in this system. Call waiting is a service used to allow customers who are busy on one call, here called the "old call", to receive notification of an incoming call, here called the "waiting call". The customer can then switch back and forth between the waiting call and the old call, usually, in order to end one of the two calls and to tell both parties what is happening. The customer signals his request to the system by briefly depressing or "flashing" his mobile unit switch hook.

Assume that mobile unit 165 is engaged in an old outgoing call including link 149 and trunk 157 when a waiting call for that mobile unit comes in to telecommunication switch 153 on trunk 158. Assume further that mobile unit 165 has call waiting service. The formats of additional messages for processing this type of situation are shown in FIG. 7, and the flow of actions is illustrated in FIG. 13.

Initially, the waiting call is treated by TSC 151 in the same way as the incoming call described with reference to FIG. 9. Initially, TSC 151 receives incoming call data (action box 551, FIG. 13). TSC 151 sends an incoming call request message 310 (FIG. 3) to MTC 101 (action box 553, FIG. 13). From the point of view of the MTC, this call is treated as one complex call following the reception of the incoming call message respecting the waiting call. From the point of view of the TSC, the call is treated at this time as two independent calls each with its own call identification. The TSC is not yet aware of the relationship between the old and waiting calls. In response to the incoming call request message 310, the MTC sends two tone request messages to the TSC, (action box 555, FIG. 13); one tone request message 320 to briefly connect call waiting tone to communication link 149 in order that mobile 165, the called party of the call waiting request, be notified that a call is waiting; and another tone request message 320 to connect the waiting call on trunk 158 to the special audible tone used in connection with call waiting service. TSC 151 sets up these connections in response to these tone request messages (action box 557). Each of these tone request messages is acknowledged by a separate tone acknowledge message 330.

If mobile unit 165 subsequently (as indicated by the dashed line between action boxes 557 and 559 of FIG. 13) indicates by a flash that it wishes to be connected to the waiting call (action box 559, FIG. 13), this flash is detected at controlling cell site 1 serving the mobile unit. A message indicating the flash is sent to the MTC via data link 144 from the controlling cell site. The MTC then generates and sends to the TSC a hold message 420 (FIG. 7) including the TSC call identity of the old call and requesting that trunk 157 on that connection be placed in a hold state (action box 561, FIG. 13). Message 420 specifies the trunk ID 421 of the trunk which is to be placed in the hold state. The TSC then sends a connect acknowledge message 350 (FIG. 3) to indicate that the requested hold action has been completed.

Figure 13:
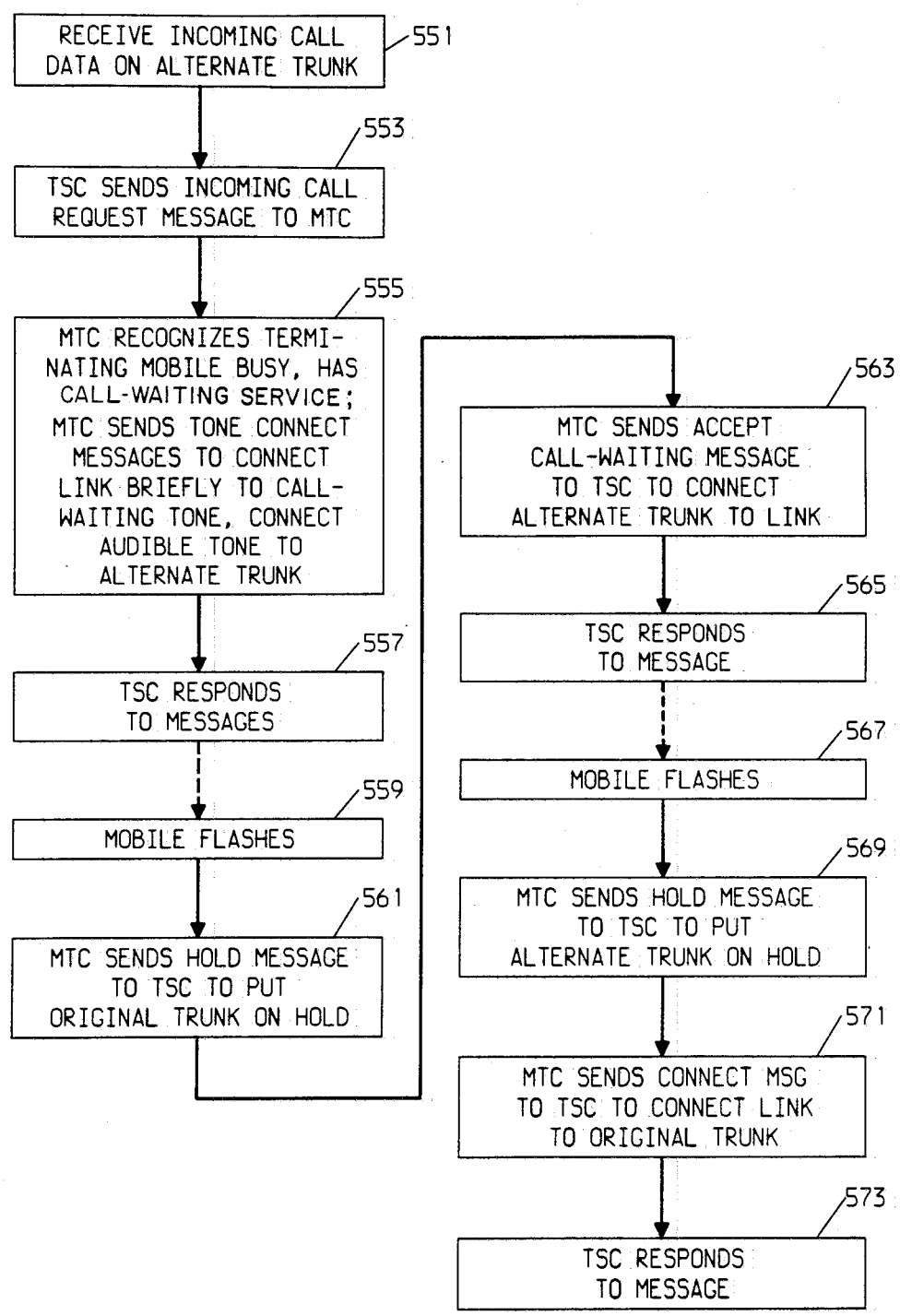

The MTC 101 then sends an accept call waiting message 430 to the TSC 151 (action box 563, FIG. 13). The prefix includes the TSC identification of the old call. The accept call waiting message includes the TSC identification 431 of the waiting call and the trunk ID 432 associated with the waiting call, in this case, the identification of trunk 158. In response to this message, the TSC adds trunk 158 to the call record information associated with the original call and sets up a separate connection between communication link 149 and trunk 158 (action box 565, FIG. 13).

Subsequently, as additional flashes are detected (action box 567, FIG. 13), MTC 101 sends a message to put one of the two trunks 157 and 158 on hold (action box 569), and to connect the other trunk to link 149 leading to the mobile unit (action box 571, FIG. 13); TSC 151 controls the change of call configuration corresponding to these messages (action box 573, FIG. 13). Eventually, one of the two trunks may disconnect at which time the TSC disconnects that trunk and places the call in the conventional talking state. If mobile unit 165 disconnects, the entire connection is torn down.

Figure 8:
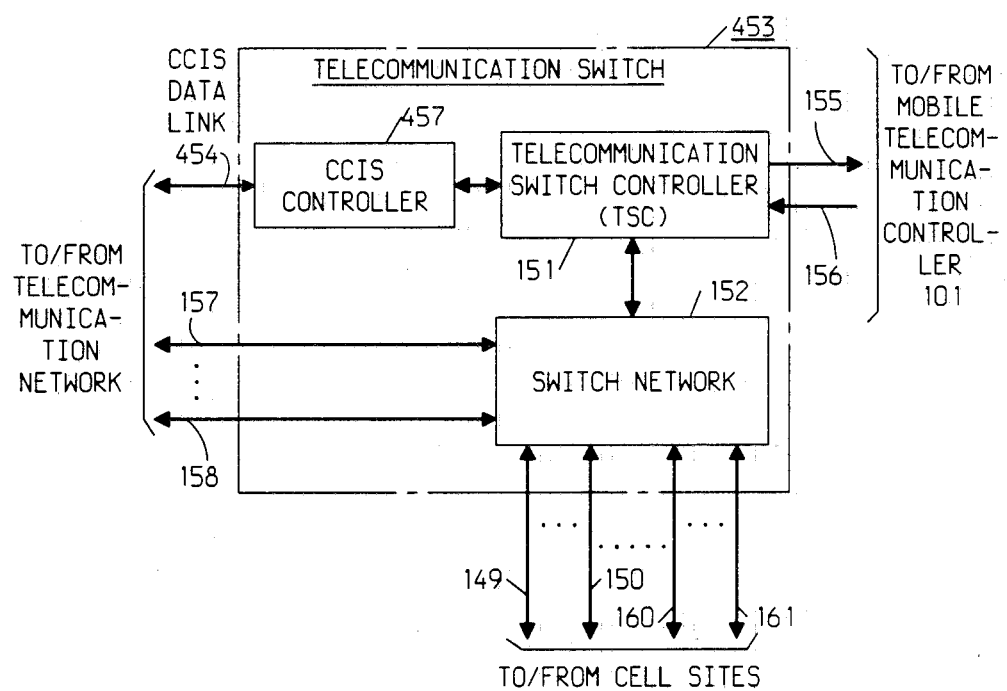
FIG. 8 illustrates an alternate embodiment of the telecommunication switch of the system of FIG. 1 configured for common channel interoffice signaling (CCIS)

FIG. 8 illustrates an alternate embodiment 453 of the telecommunication switch. Here a common channel interoffice signaling (CCIS) data link 454, is used for sending signals as data messages. CCIS represents an alternate signaling means. The CCIS link terminates at a CCIS controller 457. The trunks to the telecommunication network 157, . . . , 158 and the communication links to the cell sites (149, . . . , 150), . . . , (160, . . . , 161) remain connected to the switching network 152. The TSC controls both the CCIS controller and the network and communicates via the previously described data links 155, 156 to the MTC. Using CCIS, the identification of an incoming or outgoing trunk is part of a CCIS message and is not obtained from signals on the trunk associated with a call. The TSC 151 therefore receives the identification of an incoming trunk from CCIS controller 457. The advantages of using CCIS are well known to practitioners in the field. CCIS has been extensively described in the *Bell System Technical Journal*, Vol. 57, no. 3, February, 1978, pp. 221–478, including an overall description on pp. 225–250.

In some applications, especially those in which a cellular mobile telecommunication system covers a large area, it is desirable that one mobile telecommunication controller and associated cell sites be connected to two or more telecommunication switches. This will allow the average length of the communication links to be reduced, since each cell site can be connected to the closer of two or more telecommunication switches. If the capacity of one MTC far exceeds the capacity of an economically attractive telecommunication switch, it is also desirable to use a multi-switch configuration. An alternate embodiment of this invention in which one MTC is associated with three switches is shown in FIG. 14.

Figure 14:
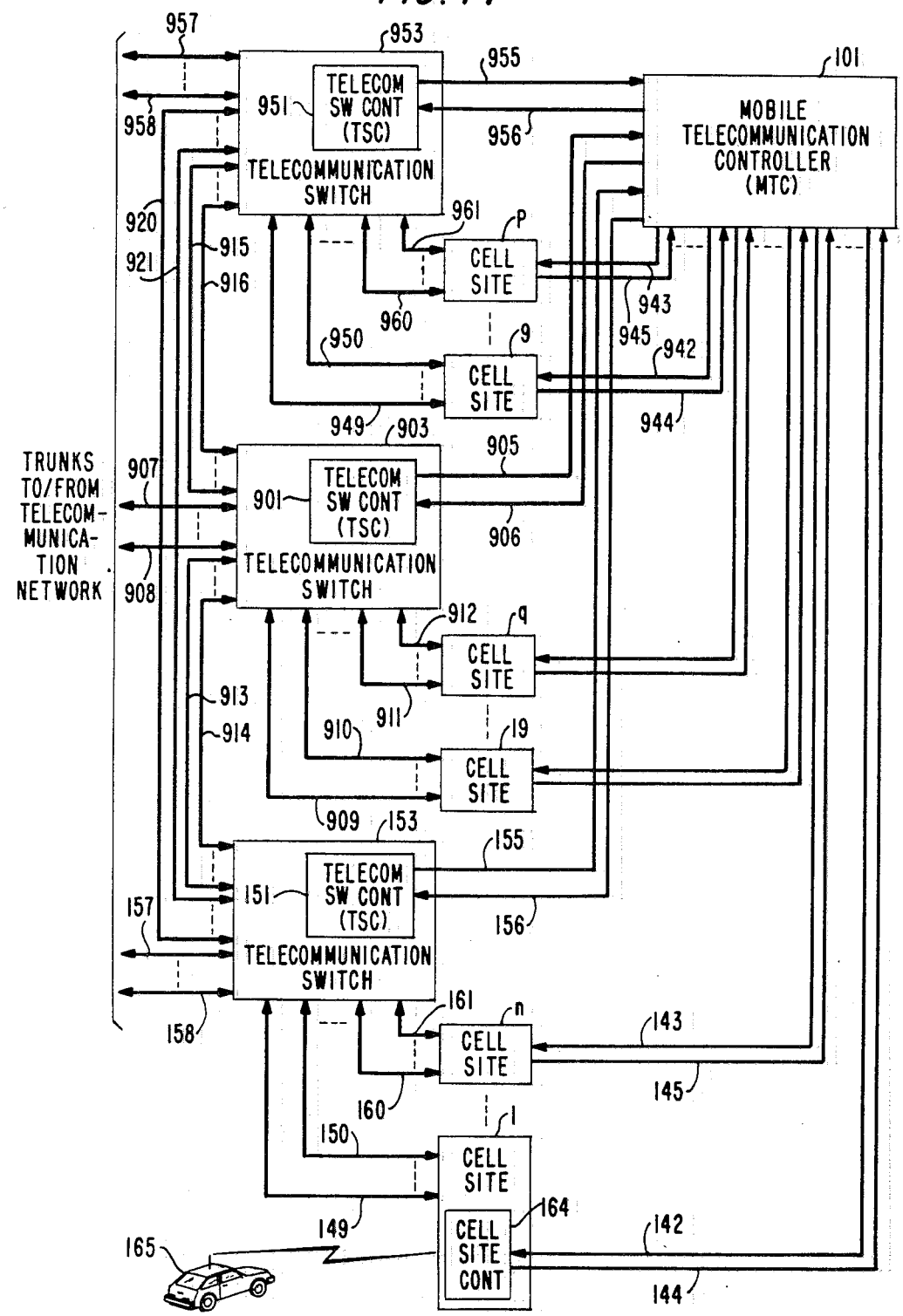
FIG. 14 is a block diagram of a multiswitch cellular mobile telecommunication system.

In the alternate embodiment of this invention illustrated in FIG. 14, all the elements of the one switch configuration FIG. 1 are retained, but second and third telecommunication switches 953 and 903 have been added. The second telecommunication switch 953 is connected to the telecommunication network by trunks 957, . . . , 958, and is connected to mobile telecommunication controller (MTC 101) by data links 955, 956. The third telecommunication switch 903 is connected to the telecommunication network by trunks 907, . . . , 908, and is connected to MTC 101 by data links 905, 906. The second telecommunication switch is also connected to another set of cell sites, 9, . . . , p, by communication links, (949, . . . , 950), . . . , (960, . . . , 961) and to the first telecommunication switch 153 by interswitch communication links 920, . . . , 921. The third telecommunication switch 903 is connected by links (909, . . . , 910), . . . , (911, . . . , 912) to cell sites 19, q, and to the first telecommunication switch 153 by interswitch links 913, . . . , 914. Interswitch links 915, . . . , 916 connect telecommunication switches 903 and 953.

For some applications in which the areas covered by cell site groups 1, . . . , n; 9, . . . , p; and 19, . . . , q are far apart, it may not be worthwhile to provide interswitch links. The configuration of FIG. 14 without interswitch links still retains the economic advantage of requiring only one MTC. The operation of such a system is straightforward and requires no further explanation since each call remain in one telecommunication switch and one group of cell sites.

The operation of the system illustrated in FIG. 14 including the interswitch links differs from the operation of the system of FIG. 1 in those calls which involve two or more telecommunication switches. For example, if mobile 165, while engaged in a call using trunk 158, moves from cell site 1 to cell site 9, and is to be connected to a transceiver connected to communication link 949, a connection must be set up from telecommunication switch 153 to telecommunication switch 953 using one of the interswitch links 920, . . . , 921, say link 920. The hand-off procedure involves setting up a connection from trunk 158 to an interswitch link, for example, 920 in telecommunication switch 153, and setting up a connection in telecommunication switch 953 between interswitch link 920 and communication link 949. These connections are substituted for the connection between trunk 158 and communication link 160 described in the earlier hand-off example. In either case, the connection from trunk 158 to communication link 149 in telecommunication switch 153 is subsequently dropped as the hand-off to the other call site is completed. The request to a telecommunication switch to set up a connection between a communication link and an interswitch link is requested as a specific connection, with the interswitch link being selected by the MTC.

Messages are sent individually from MTC 101 to TSC 151, 901 and 951 in the present alternate embodiment of the invention. Alternatively, internal data communications could be set up among the three switches and a message sent to only one TSC or to some other centralized processor. This TSC or centralized processor could then further process a message and send messages to one or more of the individual TSC.

Figure 15:
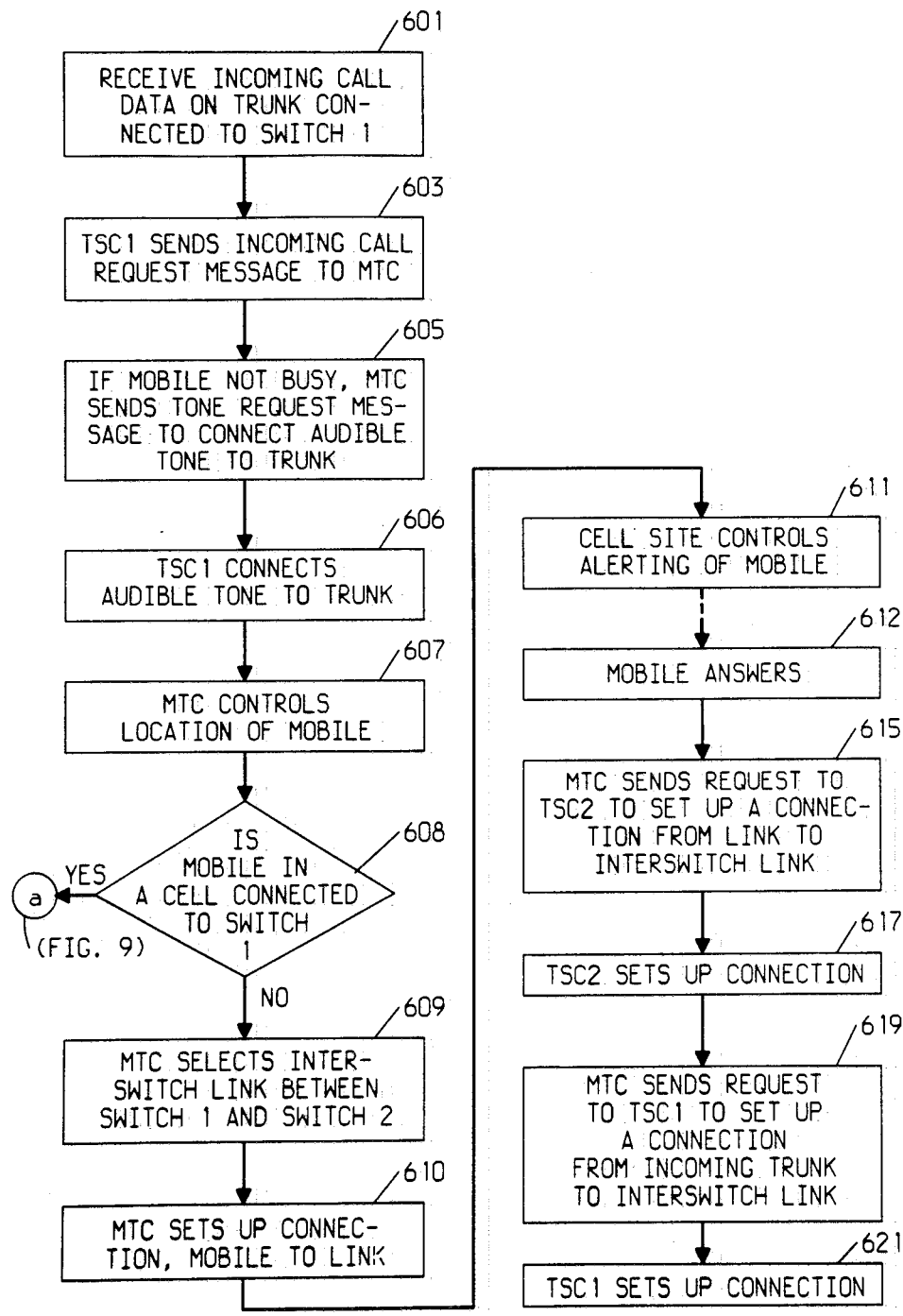
FIG. 15-19 are flow diagrams of the steps of processing calls in a multiswitch cellular mobile telecommunication system.

FIG. 15 illustrates the flow of steps of processing an incoming call from an incoming trunk on one telecommunication switch to a mobile unit in the cell area of a cell site connected to another telecommunication switch. In FIG. 15, a call that comes in on a first telecommunication switch, whose controller is referred to as TSC1 in the general flowchart language of FIG. 15, is terminated to a mobile unit served by a cell site connected to a second telecommunication switch, whose controller is referred to as TSC2. Assume that the incoming call is from trunk 158 on telecommunication switch 153 to mobile unit 165, currently in the cell area of cell site 9, connected to telecommunication switch 953. Switch 153 is switch 1 and switch 953 is switch 2 in this example.

The first steps (action boxes 601, 603, 605, 606, and 607) are the same as the equivalent steps of FIG. 9 for the single switch configuration (action boxes 501, 503, 505, 506, and 507). After the mobile has been located, a test is made (test 608) whether the mobile unit has been located in a cell site connected to the same switch (switch 1, action box 601) as the incoming trunk. If the mobile is in such a cell site, the additional steps (action boxes 508, 509, 510, 513 and 515, FIG. 9) are the same as those for a single switch system. If the mobile has been located in a cell site not connected to switch 153 (i.e., switch 1), but has been located, in cell site 9, connected to switch 953 (switch 2) controlled by TSC 951, MTC 101 selects an interswitch link such as interswitch link 920 (action box 609) to be used in the connection. MTC 101 controls the setting up of a connection between mobile 165 and, for example, communication link 949 (action box 610). The cell site controller of cell site 9 controls the alerting of mobile 165 using the transceiver connected to link 949 to send the alert signal (action box 611). When the mobile unit 165 subsequently answers (action box 612), MTC 101 sends a request to TSC 951 (TSC2) to set up a connection between link 949 and interswitch link 920 (action box 615). TSC 951 sets up this connection (action box 617). MTC 101 sends a request to TSC 151 (TSC 1) to connect interswitch link 920 to incoming trunk 158 (action box 619). TSC 153 sets up this connection (action box 621).

Alternatively, the task of selecting an interswitch link could be delegated to one of the telecommunication switch controllers. The present arrangement minimizes problems encountered in selecting such links.

FIGS. 16-19 illustrates the flow of steps of processing a hand-off request in a mobile telecommunication system of FIG. 14, with one mobile telecommunication control complex and two or more telecommunication switches. In order to keep the flow diagrams of FIGS. 16-19 general, a number of conventions are being used to distinguish among the different switches, different switch controllers, and different inter-switch links which may be required for some of the more complex call configurations. In FIGS. 16-19, the telecommunication switch connected to the trunk to the telecommunication network is called switch 1, with controller TSC1. If the connection before hand-off is only through switch 1 and after hand-off is also through another switch, that other switch is called switch 2 and its controller TSC2. If the connection before hand-off is also through a different switch, that switch is called switch 2 and its controller TSC2; if the connection after hand-off is through neither switch 1 nor switch 2, that switch is called switch 3 and its controller TSC3.

Assume, as a first example, that mobile 165, engaged in a call to trunk 158 and originally connected via link 149 to cell site 1, moves into the area of cell site 9 and is to be connected via link 949 to a transceiver in cell site 9 in FIG. 14. In this example, switch 153 connected to trunk 158 is switch 1, and its controller TSC 151 is TSC1; switch 953 connected to link 949 is switch 2 and its controller TSC 951 is TSC2. The first two steps are unchanged from those described with reference to FIG. 12. Controlling cell site 1 detects a weak signal from mobile 165 (action box 631). The cell sites (including in this case cell sites 1, ..., n; 9, ..., p; and 19, ..., q) and MTC 101 locate the vehicle and select a new link, in this case, cell site 9 and link 949 (action box 633). Next, a test (test 635) is made to determine whether the current cell site (cell site 1) and the new cell site (cell site 9) are connected to the same switch. If so, the steps previously described with reference to FIG. 12 (action boxes 535, 537, 539, 541 and 543) are executed.

If the current cell site and the new cell site are connected to different switches, as in this example, (negative result of test 635), a check is made (test 637) whether an interswitch link is already in the connection to the mobile unit. The call from trunk 158 to mobile 165, originally in the area of cell site 1, but now moved to the area of cell site 9, represents a negative result of test 637. MTC 101 selects an interswitch link, such as interswitch link 920 and sends TSC 151 (TSC 1) a connect message requesting TSC 151 to add a connection to interswitch link 920 to switch 953 (switch 2) to the connection between incoming trunk 158 and original communication link 149 (action box 649 FIG. 18). TSC 151 (TSC 1) sets up the requested 3-way connection (action box 651). MTC 101 sends TSC 951 (TSC 2) a connect message requesting that a connection be set up between interswitch link 920 and selected link 949 to a selected transceiver in cell site 9 (action box 653). TSC 951 (TSC 2) sets up that connection (action box 654). MTC 101 sets up a connection between mobile unit 165 and link 949 (action box 655). MTC 101 sends a message to TSC 151 (TSC 1) to disconnect original link 149 from the 3-way connection (action box 657). TSC 151 disconnects link 149 from the 3-way connection (action box 658). Mobile unit 165 is now connected via link 949 and interswitch link 920 to incoming trunk 158.

For the cases in which the original connection did use an interswitch link (positive result of test 637, FIG. 16, described above), a test (test 638) is made whether the new connection will require an interswitch link. Consider first the case in which the present connection uses an interswitch link and the new connection does not require such a link (negative result of test 638). This situation would take place if mobile 165 has received an incoming call on incoming trunk 158 and if it was originally in the area of cell site 9 but has now moved into the area of cell site 1 (see FIG. 14). In this case, switch 153 is switch 1, and TSC 151 is TSC 1; switch 953 is switch 2 and TSC 951 is TSC 2. Assume that mobile 165 is currently connected via interswitch link 920 and communication link 949. Mobile 165 has been located in cell site 1 and assigned to a transceiver connected to communication link 149. MTC 101 sends a connect message to TSC 151 (TSC 1) to connect incoming trunk 158 to alternate link 149 (action box 639, FIG. 19). TSC 151 (TSC 1) sets up a 3-way connection from incoming trunk 158 to interswitch link 920 and to communication link 149 (action box 641, FIG. 19). MTC 101 then changes the connection of mobile unit 165 from link 949 to link 149 (action box 643). MTC 101 then sends a clear message to TSC 151 (TSC 1) to disconnect interswitch link 920 from the 3-way connection (action box 645) and to TSC 951 (TSC 2) to disconnect the connection from interswitch link 920 to communication link 949 (action box 647). TSC 151 (TSC 1, action box 646) and TSC 951 (TSC 2, action box 648) respond to these messages. The call has now been handed off to cell site 1.

Now, consider the case in which the original connection used an interswitch link (positive result of test 637, FIG. 16, described previously) and in which the new connection will require the use of another interswitch link (positive result, test 638, described previously). For this case, it is desirable to avoid using unnecessary interswitch links in the connection. An arrangement for eliminating unnecessary links in a hand-off between separate mobile telecommunication offices is described in R. J. Hass et al., U.S. Pat. No. 4,398,063, Mobile Telephone Interoffice Handoff Limiting Method and Apparatus, issued Aug. 9, 1983. In the present embodiment of the invention, which works within a single entity or office, use of unneeded interswitch links is avoided. This is important for the case of a mobile unit which is traveling near the border between areas served by cell sites connected to different switches; otherwise, such a call could use many interswitch links, one for each recognized recrossing of the border.

As an example, assume that a call for mobile 165 came in on trunk 158 connected to switch 153 (switch 1), that mobile 165 was originally in the area served by cell site 9 connected to telecommunication switch 953 (switch 2) controlled by TSC 951. The original interswitch link 920 (called link 1 in FIG. 16 and 17) was used to connect trunk 158 to link 949 which was connected to mobile 165. Mobile 165 has now traveled to the area served by cell site 19, connected to telecommunication switch 903 (switch 3). Mobile unit 165 will be served via communication link 909 and interswitch link 913 (called link 2 in FIG. 17) after the hand-off.

Figure 16:
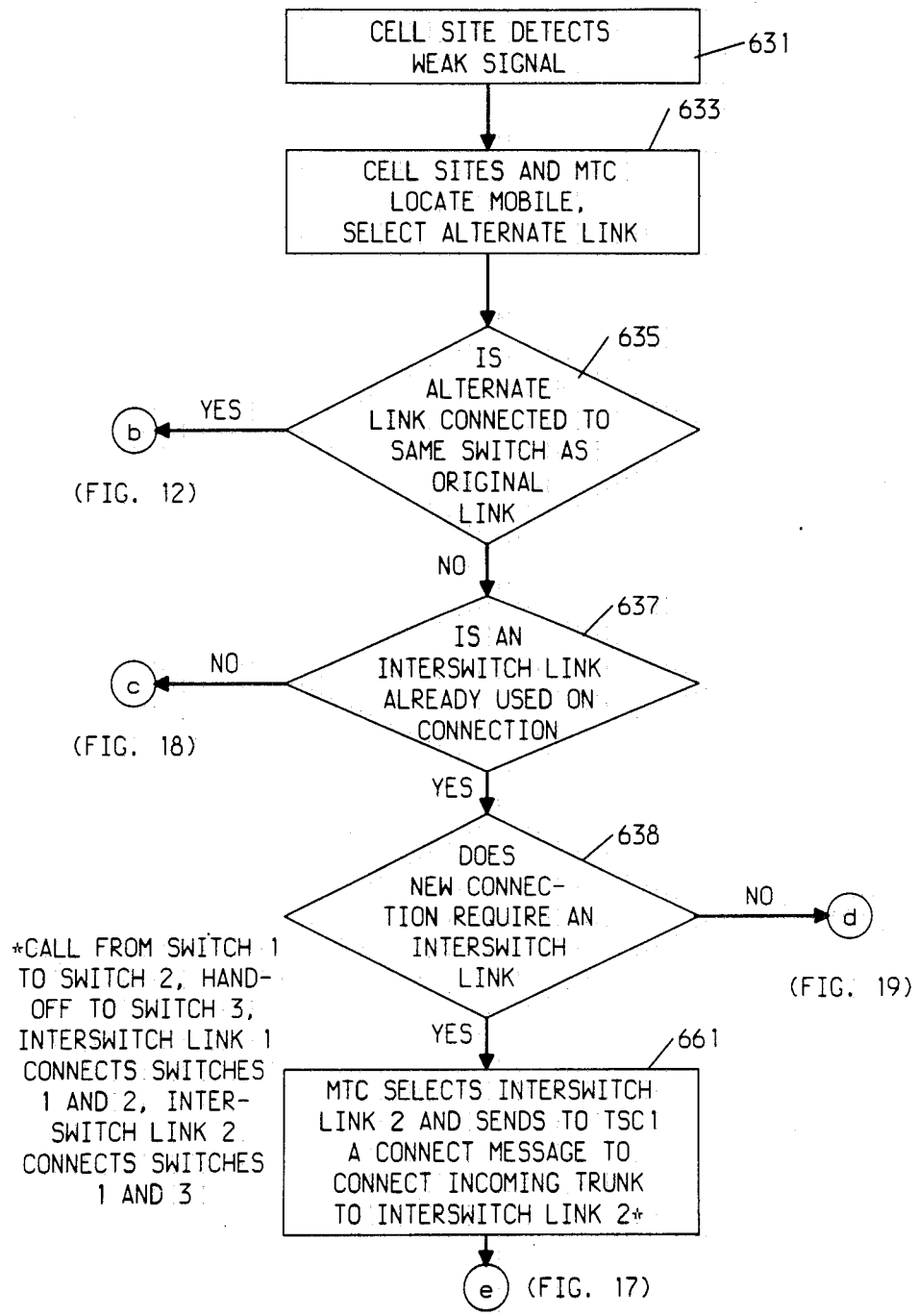
Figure 17:
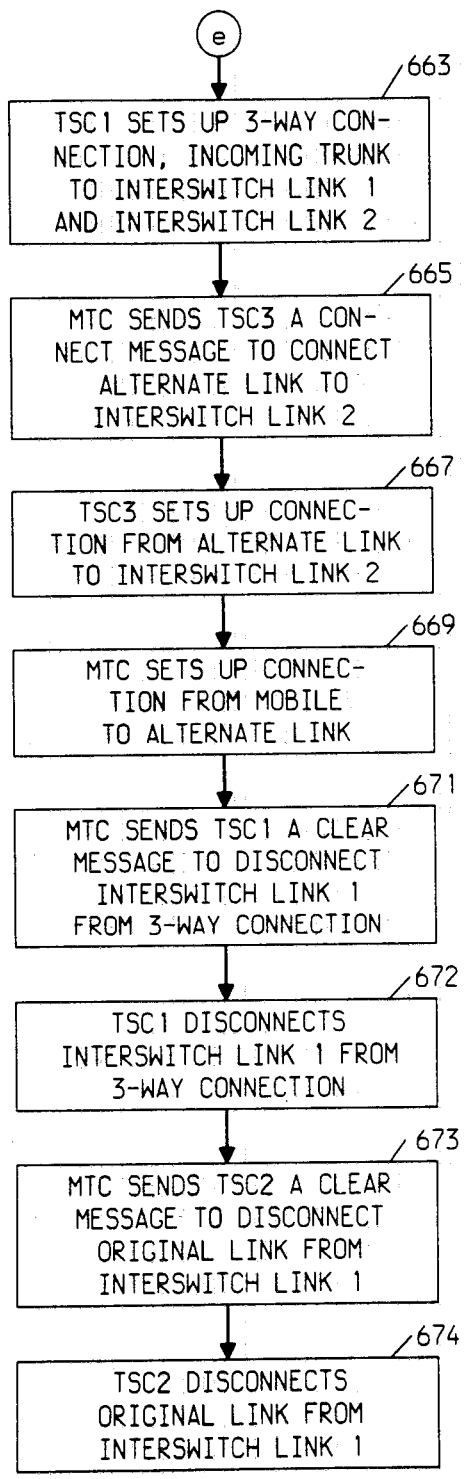
Figure 18:
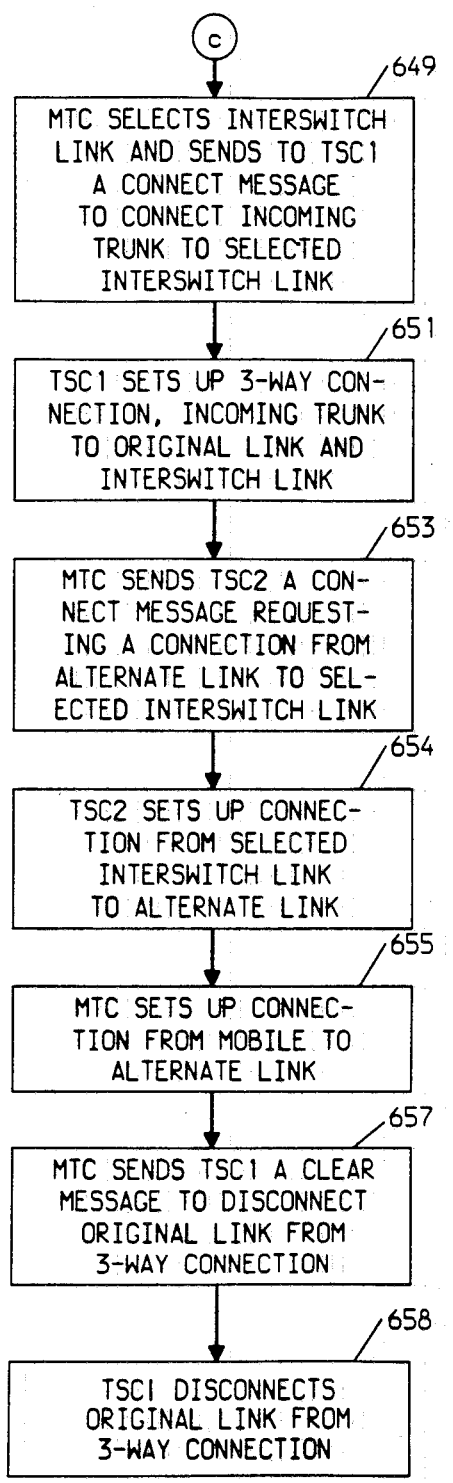
Figure 19:
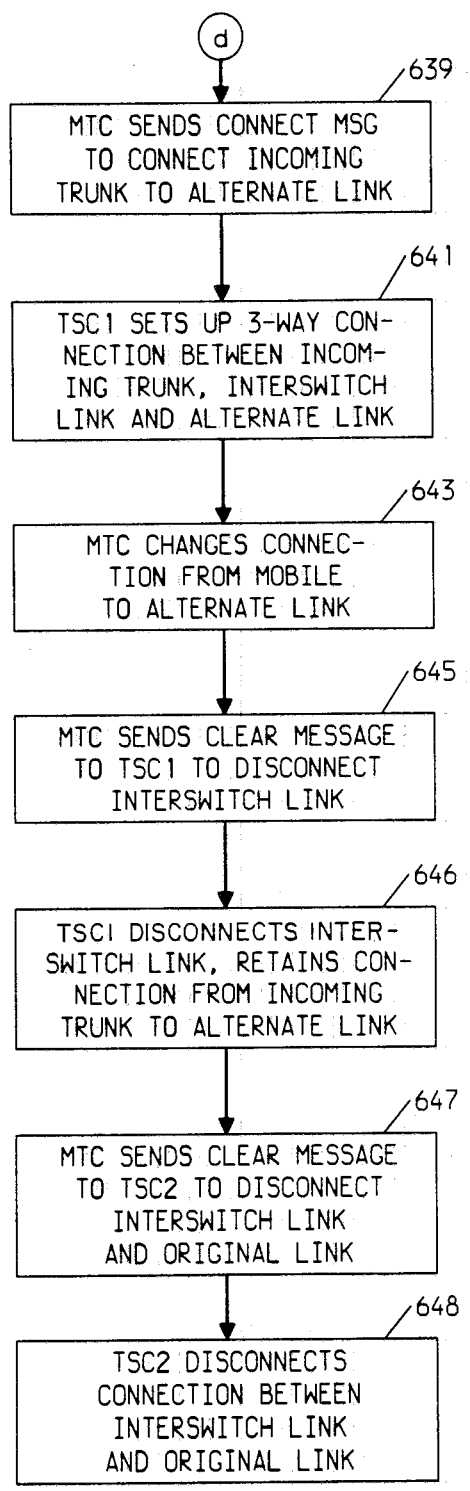

MTC 101 selects an interswitch link such as link 913 and sends TSC 151 (TSC 1) a connect message to connect incoming trunk 158 to interswitch link 913 (link 2, action box 661, FIG. 16). TSC 151 (TSC 1) sets up a 3-way connection from incoming trunk 158 to interswitch link 920 and to added interswitch link 913 (link 2, action box 663). MTC 101 sends TSC 901 (TSC 3) a connect message to connect link 909 to interswitch link 913 (link 2, action box 665). TSC 901 (TSC 3) sets up the connection (action box 667). MTC 101 sets up the connection from mobile unit 165 to link 909 (action box 669). MTC 101 sends TSC 151 (TSC 1) a clear message to disconnect interswitch link 920 from the 3-way connection (action box 671). TSC 151 disconnects interswitch link 920 from the 3-way connection (action box 672). MTC 101 sends TSC 951 (TSC 2) a clear message to disconnect the connection between original link 949 and interswitch link 920 (action box 673). TSC 951 disconnects that connection (action box 674). Now, mobile unit 165 is connected via communication link 909 and interswitch link 913 to incoming trunk 158; communication link 949 and its associated transceiver and interswitch link 920 are released and available for service.

The above examples illustrate the use of the present invention in a system with one telecommunication control complex and several telecommunication switches. The techniques for setting up outgoing calls and call-waiting calls previously described for the single telecommunication switch case can be similarly extended in a straightforward way using programming techniques well known in the art to the multiple telecommunication switch case.

Alternatively, incoming calls and handed-off calls can be reswitched in the telecommunication network so that fewer or no calls would require the use of interswitch links. For example, an incoming call on telecommunication switch 153 to a mobile unit located in a cell area controlled by a cell site connected to switch 953 (FIG. 14) could be rerouted so that the incoming call would come in on one of the trunks 957, . . . , 958. The techniques of call rerouting and the trade-offs between call rerouting or use of interswitch links are known by practitioners in the field and have been used, for example, in the Canadian Novatel system.

The combination of cell sites, transceivers, control transceivers and tunable mobile ratios effectively forms a first connection stage, and the mobile telecommunication switch forms a second connection stage. The first connection stage, the means for interconnecting links and mobile units, has the characteristics that any given link can only be connected to those mobiles which are near the cell site connected to that link. One mobile may thus be connectable at any given time to a member of a link group in one of several cell sites, but not, in general, to a link in every cell site. Effectively, such a mobile unit is a member of several subsets, one subset for every cell site or, for cell sites equipped with directional antennas, for every directional antenna whose signal the mobile can receive. Similarly, every link of a cell site is a member of a subset of links or mobiles accessible from that cell site. There may be several subsets per cell site, for example, if the cell site has directional antennas. Alternatively, it is also possible to have a single link connectable to more than one cell site, or to more than one directional antenna in a cell site, in which case the link is a member of more than one subset. In a cellular mobile telecommunication system, connections between a mobile unit and a link are only possible when both are members of a common subset.

It is to be understood that the above-described embodiments are merely illustrative of the principles of this invention; other arrangements may be devised by those skilled in the art without departing from the spirit and scope of the invention.

What is claimed is:

1. A telecommunication system for communicating between a telecommunication network and a plurality of telecommunication units each having an associated identity code, comprising:

telecommunication switch means for connection to said telecommunication network via a plurality of first communication links, comprising signaling means for receiving incoming call requests from said telecommunication network;
a plurality of second communication links connected to said telecommunication switch means;
interconnecting means responsive to control signals for interconnecting said plurality of second communication links and said telecommunication units;
a telecommunication control complex;
data communication means interconnecting said telecommunication switch means and said telecommunication control complex;
said telecommunication switch means being responsive to an incoming call request associated with one of said first communication links and comprising an identity code associated with at least one of said telecommunication units, to generate and transmit an incoming call request message comprising identification data representing said incoming call request identity code to said telecommunication control complex over said data communication means;
said telecommunication control complex being responsive to said incoming call request message to generate a control signal to said interconnecting means to connect one of said telecommunication units corresponding to said identification data to one of said second communication links, and to generate and transmit over said data communication means a response message comprising the identity of said one of said second communication links; and
said telecommunication switch means being responsive to said response message to connect said one of said first communication links to said one of said second communication links.

2. The telecommunication system of claim 1 in which said interconnecting means further comprises link switching means responsive to control signals from said control complex for selectively interconnecting said plurality of second communication links and said telecommunication units, and said telecommunication control complex is responsive to said incoming call request message to generate said control signal for controlling said link switching means to interconnect said one of said telecommunication units corresponding to said identification data and said one of said second communication links.

3. The telecommunication system of claim 2 wherein each of said telecommunication units and each of said second communication links is a member of one or more of a plurality of subsets each comprising telecommunication units and second communication links and wherein said link switching means is arranged to connect only telecommunication units and second communication links that are members of the same subset.

4. The telecommunication system of claim 1 wherein said telecommunication switch means comprises at least two telecommunication switches, each of said at least two telecommunication switches being connected to subsets of said pluralities of first and second communication links, and wherein each of said at least two telecommunication switches is adapted to generate and transmit said incoming call request message to said telecommunication control complex and to receive and respond to said response message from said telecommunication control complex.

5. A mobile telecommunication system for communicating between a telecommunication network and a plurality of mobile telecommunication units each having an associated identity code, comprising:
telecommunication switch means for connection to said telecommunication network via a plurality of first communication links, comprising signaling means for receiving incoming call requests from said telecommunication network;
a plurality of second communication links connected to said telecommunication switch means;
interconnecting means responsive to control signals for interconnecting said plurality of second communication links and said telecommunication units;
a telecommunication control complex;
data communication means interconnecting said telecommunication switch means and said telecommunication control complex;
said telecommunication switch means being responsive to an incoming call request associated with one of said first communication links, and comprising an identity code associated with at least one of said mobile telecommunication units, to generate and transmit an incoming call request message comprising identification data representing said incoming call request identity code to said telecommunication control complex over said data communication means;
said telecommunication control complex being responsive to said incoming call request message to generate a control signal to said interconnecting means to connect one of said mobile telecommunication units corresponding to said identification data to one of said second communication links, and to generate and transmit over said data communication means a response message comprising the identity of said one of said second communication links; and
said telecommunication switch means being further responsive to said response message to connect said one of said first communication links to said one of said second communication links.

6. The mobile telecommunication system of claim 5, wherein said telecommunication control complex comprises:
a mobile telecommunication controller connected to said data communication means;
a plurality of mobile radio cell site controllers; and
a plurality of data channels interconnecting said mobile telecommunication controller and said plurality of mobile radio cell site controllers;
and wherein said interconnecting means comprises a plurality of radio transceivers responsive to control signals from said control complex for selectively interconnecting said plurality of second communication links and said mobile telecommunication units, said telecommunication control complex being responsive to said incoming call request message to generate said control signal for controlling said plurality of radio transceivers to interconnect said one of said mobile telecommunication units corresponding to said identification data and said one of said second communication links.

7. The mobile telecommunication system of claim 6 wherein said telecommunication control complex is adapted to generate and transmit a hand-off message comprising the identity of an other of said second communication links to said telecommunication switch means; and
   wherein said telecommunication switch means is responsive to said hand-off message to connect said one of said first communication links to said other of said second communication links.

8. The telecommunication system of claim 6 wherein said telecommunication switch means comprises at least two telecommunication switches, each of said at least two telecommunication switches being connected to subsets of said pluralities of first and second communication links, and wherein each of said at least two telecommunication switches is adapted to generate and transmit said incoming call request message to said telecommunication control complex and to receive and respond to said response message from said telecommunication control complex.

9. Telecommunication switch means for use in a telecommunication system for communicating between a telecommunication network, connected to said telecommunication switch means via a plurality of first communication links, and a plurality of telecommunication units each having an associated identity code, and comprising a plurality of second communication links connected to said telecommunication switch means, interconnecting means for interconnecting said plurality of second communication links and said plurality of telecommunication units, a telecommunication control complex for controlling said interconnecting means, and data communication means interconnecting said telecommunication switch means and said telecommunication control complex, said telecommunication switch means comprising:
   signaling means for receiving incoming call requests from said telecommunication network;
   a switching network connected to said pluralities of first and second communication links; and
   a telecommunication switch controller for receiving incoming call requests from said signaling means and for controlling said switching network;
   said telecommunication switch controller being responsive to an incoming call request associated with one of said first communication links and comprising an identity code associated with at least one of said telecommunication units to generate and transmit an incoming call request message comprising identification data representing said incoming call request identity code to said telecommunication control complex over said data communication means; and
   said telecommunication switch controller being responsive to a response message from said telecommunication control complex, comprising the identity of one of said second communication links, to control the connection by said switching network of said one of said second communication links to said one of said first communication links.

10. The telecommunication switch means of claim 9 wherein said signaling means comprises a common channel interoffice signaling controller for communicating with a common channel interoffice signaling network.

11. Telecommunication switch means for use in a mobile telecommunication system for communicating between a telecommunication network, connected to said telecommunication switch means via a plurality of first communication links, and a plurality of mobile telecommunication units each having an associated identity code, and comprising a plurality of second communication links connected to said telecommunication switch means, interconnecting means for interconnecting said plurality of second communication links and said plurality of mobile telecommunication units, a telecommunication control complex for controlling said interconnecting means, and data communication means interconnecting said telecommunication switch means and said mobile telecommunication control complex, said telecommunication switch means comprising:
   signaling means for receiving incoming call requests from said telecommunication network;
   a switching network connected to said pluralities of first and second communication links; and
   a telecommunication switch controller for receiving incoming call requests from said signaling means and for controlling said switching network;
   said telecommunication switch controller being responsive to an incoming call request associated with one of said first communication links and comprising an identity code associated with at least one of said mobile telecommunication units to generate and transmit an incoming call request message comprising identification data representing said incoming call request identity code to said telecommunication control complex over said data communication means; and
   said telecommunication switch controller being responsive to a response message from said telecommunication control complex, comprising the identity of one of said second communication links, to control the connection by said switching network of said one of said second communication links to said one of said first communication links.

12. The telecommunication switch means of claim 11 wherein said signaling means comprises a common channel interoffice signaling controller for communicating with a common channel interoffice signaling network.

13. Apparatus for communicating between telecommunication switch means and a plurality of telecommunication units each having a unique identity, comprising:
   a telecommunication control complex;
   data communication means for connecting said telecommunication control complex and said telecommunication switch means; and
   interconnecting means for connection to said telecommunication switch means via a plurality of communication links, responsive to control signals for interconnecting said plurality of communication links and said telecommunication units;
   said telecommunication control complex being responsive to an incoming call request message received from said telecommunication switch means on said data communication means and comprising identification data corresponding to at least one of said telecommunication units to generate a control signal to said interconnecting means to connect one of said telecommunication units corresponding to said identification data to one of said communication links.

14. The apparatus of claim 13 in which said telecommunication control complex is further responsive to said incoming call request message to generate and transmit over said data communication means a response message comprising the identity of said one of said communication links.

15. Apparatus for communicating between telecommunication switch means and a plurality of mobile telecommunication units each having a unique identity, comprising:
 a mobile telecommunication control complex;
 data communication means for connecting said telecommunication control complex and said telecommunication switch means; and
 interconnecting means for connection to said telecommunication switch means via a plurality of communication links, responsive to control signals for interconnecting said plurality of communication links and said mobile telecommunication units;
 said mobile telecommunication control complex being responsive to an incoming call request message received from said telecommunication switch means on said data communication means and comprising identification data corresponding to at least one of said mobile telecommunication units to generate a control signal to said interconnecting means to connect one of said mobile telecommunication units corresponding to said identification data to one of said communication links.

16. The apparatus of claim 15 in which said mobile telecommunication control complex is further responsive to said incoming call request message to generate and transmit over said data communication means a response message comprising the identity of said one of said communication links.

17. In a telecommunication system for communicating between a telecommunication network, connected to said system via a plurality of first communication links, and a plurality of telecommunication units each having an associated identity code, said telecommunication system comprising a telecommunication control complex, telecommunication switch means, a plurality of second communication links connected to said telecommunication switch means, and interconnecting means for interconnecting said plurality of second communication links and said telecommunication units, a method of providing a connection between said telecommunication network and said telecommunication units, comprising the steps of:
 receiving in said telecommunication switch means from said telecommunication network an incoming call request associated with one of said first communication links and comprising an identity code associated with at least one of said telecommunication units;
 generating and transmitting to said telecommunication control complex, in response to said incoming call request, an incoming call request message comprising identification data representing said incoming call request identity code;
 connecting, in said interconnecting means under the control of said telecommunication control complex, one of said telecommunication units corresponding to said identification data to one of said second communication links in response to said incoming call request message, and generating and transmitting to said telecommunication switch means a response message comprising the identity of said one of said second communication links; and
 connecting said one of said first communication links to said one of said second communication links in response to said response message.

18. In the telecommunication systems of claim 17, the method of providing a connection between said telecommunication network and said telecommunication units, further comprising the steps of:
 receiving in said telecommunication switch means an other incoming call request associated with an other of said first communication links, comprising said identity code associated with at least one of said telecommunication units, from said telecommunication network;
 generating and transmitting an other incoming call request message from said telecommunication switch means to said telecommunication control complex in response to said other incoming call request, comprising said identification data representing said identity code associated with at least one of said telecommunication units;
 detecting a call-waiting accept signal from said one of said telecommunication units corresponding to said identification data;
 sending a connect message from said telecommunication control complex to said telecommunication switch means in response to said detection of said call-waiting accept signal; and
 setting up a connection in said telecommunication switch means between said one of said second communication links and said other of said first communication links in response to said connect message.

19. In a mobile telecommunication system for communicating between a telecommunication network, connected to said system via a plurality of first communication links, and a plurality of mobile telecommunication units each generating a radio signal and having an associated identity code, said mobile telecommunication system comprising a telecommunication control complex, telecommunication switch means, a plurality of second communication links connected to said telecommunication switch means, and interconnecting means for interconnecting said plurality of second communication links and said mobile telecommunication units, a method of providing a connection between said telecommunication network and said mobile telecommunication units, comprising the steps of:
 receiving in said telecommunication switch means from said telecommunication network an incoming call request associated with one of said first communication links and comprising an identity code associated with at least one of said mobile telecommunication units;
 generating and transmitting to said telecommunication control complex, in response to said incoming call request, an incoming call request message comprising identification data representing said incoming call request identity code;

connecting, in said interconnecting means under the control of said telecommunication control complex, one of said mobile telecommunication units corresponding to said identification data to one of said second communication links in response to said incoming call request message, and generating and transmitting to said telecommunication switch means a response message comprising the identity of said one of said second communication links; and connecting said one of said first communication links to said one of said second communication links in response to said response message.

20. In the mobile telecommunication system of claim 19, the method of providing a connection between said telecommunication network and said mobile telecommunication units, further comprising the steps of:

monitoring the radio signal of said one of said mobile telecommunication units from said telecommunication control complex and detecting a weak radio signal;

connecting said one of said mobile telecommunication units to an other second communication link under the control of said telecommunication control complex in response to said detection of a weak signal;

generating and transmitting from said telecommunication control complex to said telecommunication switch means a hand-off message to connect said one of said first communication links to said other of said second communication links;

connecting said other of said second communication links to said one of said first communication links in said telecommunication switch means in response to said hand-off message.

21. In the mobile telecommunication system of claim 19, the method of providing a connection between said telecommunication network and said mobile telecommunication units, further comprising the steps of:

receiving in said telecommunication switch means an other incoming call request associated with an other of said first communication links, comprising said identity code associated with at least one of said mobile telecommunication units, from said telecommunication network;

generating and transmitting an other incoming call request message from said telecommunication switch means to said telecommunication control complex in response to said other incoming call request, comprising said identification data representing said identity code associated with at least one of said telecommunication units;

detecting a call-waiting accept signal from said one of said telecommunication units corresponding to said identification data;

sending a connect message from said telecommunication control complex to said telecommunication switch means in response to said detection of said call-waiting accept signal; and setting up a connection in said telecommunication switch means between said one of said second communication links and said other of said first communication links in response to said connect message.

22. A telecommunication system for communicating between a telecommunication network and a plurality of telecommunication units each having an associated identity code, comprising:

telecommunication switch means, comprising a first and a second telecommunication switch, for connection to said telecommunication network via a plurality of first communication links connected to said first and said second telecommunication switches, further comprising signaling means for receiving incoming call requests from said telecommunication network and a plurality of third communication links interconnecting said first and said second telecommunication switches;

a plurality of second communication links connected to said first and to said second telecommunication switch;

interconnecting means responsive to control signals for interconnecting said plurality of second communication links with said telecommunication units;

a telecommunication control complex;

data communication means interconnecting said telecommunication switch means and said telecommunication control complex;

said telecommunication switch means being responsive to an incoming call request associated with one of said first communication links connected to said first telecommunication switch and comprising an identity code associated with at least one of said telecommunication units, to generate and transmit and incoming call request message comprising identification data representing said incoming call request identity code to said telecommunication control complex;

said telecommunication control complex being responsive to said incoming call request message to generate a control signal to said interconnecting means to connect one of said telecommunication units corresponding to said identification data to one of said second communication links connected to said second telecommunication switch, and to generate and transmit to said telecommunication switch means at least one response message comprising the identity of said one of said second communication links;

said telecommunication switch means being responsive to said at least one response message to control said second telecommunication switch to connect one of said third communication links to said one of said second communication links and to control said first telecommunication switch to connect said one of said third communication links to said one of said first communication links.

23. In the telecommunication system of claim 22, wherein said telecommunication control complex is further responsive to said incoming call request message to select said one of said third communication links, wherein said at least one response message further comprises the identity of said one of said third communication links, and wherein said telecommunication switch means is responsive to said at least one response message to connect said one of said third communication links to said one of said second communication links and said one of said first communication links.

24. In a telecommunication system for communicating between a telecommunication network and a plurality of telecommunication units, and comprising a telecommunication control complex, telecommunication switch means comprising a first and a second telecommunication switch connected to said telecommunication network via a plurality of first communication links and a plurality of third communication links interconnecting said first and said second telecommunication switches, a plurality of second communication links connected to said first and said second telecommunication switches, and interconnecting means for interconnecting said second communication links with said telecommunication units, a method of providing a connection between said telecommunication network and said telecommunication units, comprising the steps of:

receiving in said telecommunication switch means from said telecommunication network an incoming call request associated with one of said first communication links connected to said first telecommunication switch and comprising an identity code associated with at least one of said telecommunication units;

generating and transmitting to said telecommunication control complex, in response to said incoming call request, an incoming call request message comprising identification data representing said identity code;

connecting, in said interconnecting means under the control of said telecommunication control complex, one of said telecommunication units corresponding to said identification data to one of said second communication links connected to said second telecommunication switch, and generating and transmitting at least one message, comprising the identity of said one of said second communication links, to said telecommunication switch means;

connecting one of said third communication links to said one of said second communication links in said second telecommunication switch in response to said at least one message; and connecting said one of said first communication links to said one of said third communication links in said first telecommunication switch in response to said at least one message.

25. In the telecommunication system of claim 24, the method of providing a connection between said telecommunication network and said telecommunication units, wherein said step of connecting one of said telecommunication units and generating and transmitting at least one message comprises the step of selecting said one of said third communication links, and wherein said at least one message comprises the identity of said one of said third communication links selected in said selecting step.

26. A mobile telecommunication system for communicating between a telecommunication network, connected to said telecommunication switch means via a plurality of first communication links, and a plurality of mobile telecommunication units, comprising:

telecommunication switch means, comprising a first and a second telecommunication switch connected to said plurality of first communication links, a plurality of third communication links interconnecting said first and said second telecommunication switches, and signaling means for receiving incoming call requests from said telecommunication network;

a telecommunication control complex;

data communication means interconnecting said telecommunication switch means and said telecommunication control complex;

a plurality of second communication links connected to said first and to said second telecommunication switch;

interconnecting means responsive to control signals for interconnecting said second communication links with said mobile telecommunication units;

wherein said telecommunication control complex is adapted to generate a control signal to said interconnecting means to reconnect one of said mobile units, currently connected to one of said first communication links connected to said first telecommunication switch, from one of said second communication links connected to said first telecommunication switch to one of said second communication links connected to said second telecommunication switch, and to generate and transmit to said telecommunication switch means at least one message, said at least one message comprising the identity of said one of said second communication links connected to said second telecommunication switch;

wherein said telecommunication switch means is responsive to said at least one message to control said second telecommunication switch to set up a connection between said one of said second communication links connected to said second telecommunication switch and one of said third communication links and to control said first telecommunication switch to set up a connection between said one of said first communication links and said one of said third communication links.

27. In a mobile telecommunication system for communicating between a telecommunication network and a plurality of mobile telecommunication units each generating a radio signal, and comprising a telecommunication control complex, telecommunication switch means comprising a first and a second telecommunication switch connected to said telecommunication network via a plurality of first communication links and a plurality of third communication links interconnecting said first and said second telecommunication switches, a plurality of second communication links connected to said first and said second telecommunication switches, and interconnecting means for interconnecting said second communication links with said mobile telecommunication units, a method of changing a connection between said telecommunication network and one of said mobile telecommunication units, said connection being from one of said first communication links connected to said first telecommunication switch and including one of said second communication links connected to said first telecommunication switch, comprising the steps of:

monitoring the radio signal of said one of said mobile telecommunication units from said telecommunication control complex and detecting a weak radio signal;

locating said one of said mobile telecommunication units in response to said step of detecting a weak radio signal;

connecting said one of said mobile telecommunication units to an other of said second communication links in response to said locating step, said other of said second communication links being connected to said second telecommunication switch;

generating and transmitting from said telecommunication control complex at least one message to said telecommunication switch means in response to said locating step, said at least one message comprising the identity of said other of said second communication links;

connecting in said first telecommunication switch said one of said first communication links to one of said third communication links in response to said at least one message; and connecting in said second telecommunication switch said one of said third communication links to said other of said second communication links, in response to said at least one message.

28. In the mobile telecommunication system of claim 27, the method of changing a connection between said telecommunication network and said one of said telecommunication units, wherein said step of generating and transmitting at least one message comprises the step of selecting said one of said third communication links, and wherein said at least one message comprises the identity of said one of said third communication links selected in said selecting step.

* * * * *

UNITED STATES PATENT AND TRADEMARK OFFICE
CERTIFICATE OF CORRECTION

PATENT NO. : 4,599,490

DATED : July 8, 1986

INVENTOR(S) : Ronald G. Cornell, George D. Huensch
Kenneth W. Shelhamer, Pramod Warty It is certified that error appears in the above-identified patent and that said Letters Patent is hereby corrected as shown below:

Column 30, claim 22, line 28, change "and" to --an--.

Signed and Sealed this

Thirteenth Day of January, 1987

Attest:

DONALD J. QUIGG

*Attesting Officer*    *Commissioner of Patents and Trademarks*